US012737048B2

(12) United States Patent
Park et al.

(10) Patent No.: US 12,737,048 B2
(45) Date of Patent: Sep. 15, 2026

(54) DISPLAY TERMINAL, VIRTUAL TACTILE DEVICE, AND VIRTUAL TACTILE SYSTEM INCLUDING THEREOF

(71) Applicant: ELECTRONICS AND TELECOMMUNICATIONS RESEARCH INSTITUTE, Daejeon (KR)

(72) Inventors: Kang-Ho Park, Daejeon (KR); Yousung Kang, Daejeon (KR); Hyung-Kun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 19/213,524

(22) Filed: May 20, 2025

(65) Prior Publication Data

US 2026/0016899 A1 Jan. 15, 2026

(30) Foreign Application Priority Data

Jul. 12, 2024 (KR) ........................ 10-2024-0092632
Dec. 13, 2024 (KR) ........................ 10-2024-0186241

(51) Int. Cl.
*G06F 3/01* (2006.01)
*G06F 3/033* (2013.01)

(52) U.S. Cl.
CPC .............. *G06F 3/016* (2013.01); *G06F 3/033* (2013.01); *G06F 2203/0331* (2013.01)

(58) Field of Classification Search
None
See application file for complete search history.

(56) References Cited

U.S. PATENT DOCUMENTS 10,599,219 B2 3/2020 Choi
11,016,569 B2 5/2021 An et al.
(Continued)

FOREIGN PATENT DOCUMENTS

KR 10-2422461 B1 7/2022
KR 10-2535518 B1 5/2023

OTHER PUBLICATIONS

A. Iggo, "Sensory receptors in the skin of mammals and their sensory functions", Rev. Neurol. 1985, vol. 141, No. 10, pp. 599~613, Paris 1985.

*Primary Examiner* — Christopher J Kohlman
(74) *Attorney, Agent, or Firm* — LRK PATENT LAW FIRM

(57) ABSTRACT

A virtual tactile device is provided, which includes a display terminal and a wearable device that receives information about a position, a shape, and a physical property of an object displayed on the display screen, and the user's finger position. In one example, the wearable device includes a micro-displacement stimulation element that is in close contact with the user's finger skin. When the finger wearing the wearable device contacts an object displayed on the display screen or moves on the screen of the display terminal, the micro-displacement stimulation element applies a micro-displacement stimulus to the finger skin, selectively triggering action potentials of multiple tactile receptors in the skin. In coordination with the display terminal's screen, the system can provide tactile feedback, including protruding pressure sensations, curvature, and friction textures.

16 Claims, 25 Drawing Sheets

(56) References Cited

U.S. PATENT DOCUMENTS

| | | | | |
|---|---|---|---|---|
| 11,314,333 | B2 | 4/2022 | Yamano et al. | |
| 2010/0270089 | A1 | 10/2010 | Kyung et al. | |
| 2014/0062682 | A1 * | 3/2014 | Birnbaum | A61B 5/0002 340/407.2 |
| 2014/0125469 | A1 * | 5/2014 | Smith | G08B 6/00 340/407.2 |
| 2014/0313022 | A1 * | 10/2014 | Moeller | G08B 6/00 340/407.1 |
| 2016/0274662 | A1 * | 9/2016 | Rimon | G06F 3/16 |
| 2017/0147864 | A1 | 5/2017 | Ahn | |
| 2021/0240267 | A1 * | 8/2021 | Gajiwala | G06F 3/0219 |
| 2023/0393661 | A1 | 12/2023 | Chun | |

* cited by examiner

FIG. 1

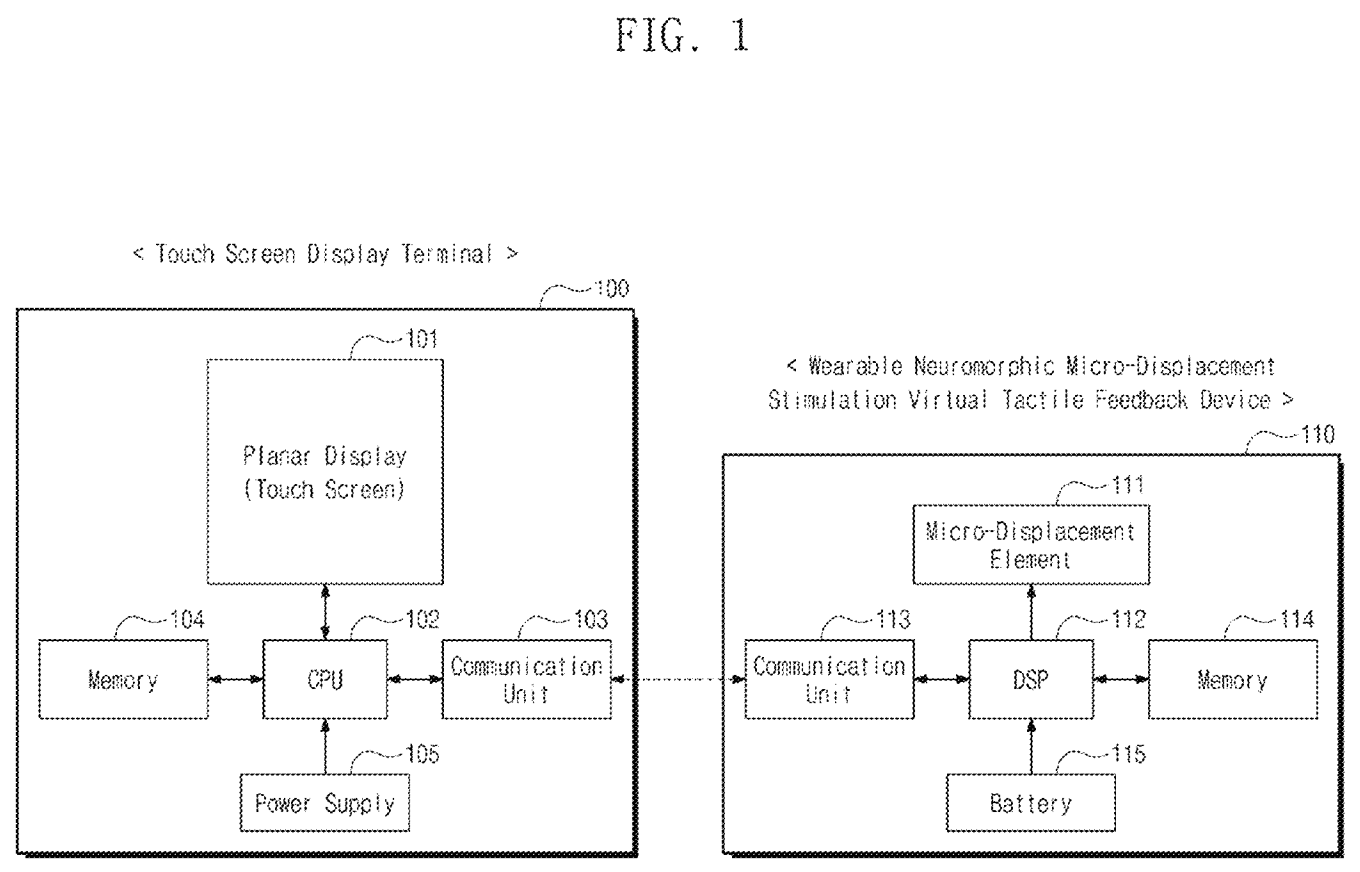

< Touch Screen Display Terminal >
100
101 Planar Display (Touch Screen)
102 CPU
103 Communication Unit
104 Memory
105 Power Supply < Wearable Neuromorphic Micro-Displacement Stimulation Virtual Tactile Feedback Device >
110
111 Micro-Displacement Element
112 DSP
113 Communication Unit
114 Memory
115 Battery

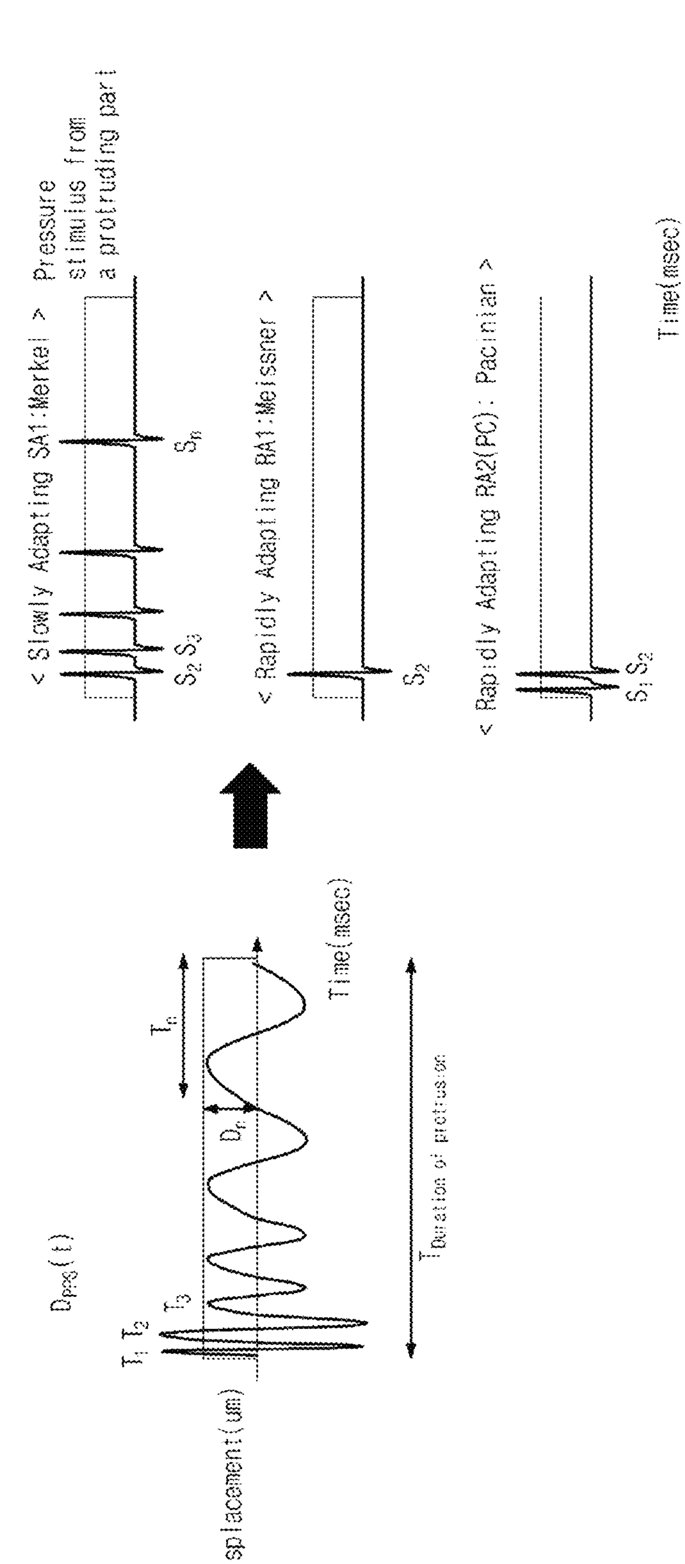
FIG. 6
[Neuromorphic micro-displacement stimulation for tactile pressure sensation on a protrusion]
Displacement(um)
DPPS(t)
T1 T2
T3
Tn
Dn
Time(msec)
TDuration of protrusion
[Tactile neuron action potential spike firing]
Nerve Signal
< Slowly Adapting SA1:Merkel >
Pressure stimulus from a protruding part
S2 S3
Sn
< Rapidly Adapting RA1:Meissner >
S2
< Rapidly Adapting RA2(PC): Pacinian >
S1 S2
Time(msec)

Cross-Sectional Image Information
Planar Image Information
Displacement (um)
Time (msec)
A
B
$D_T(\vec{r},\vec{v})$
$D_{FPP}(\vec{V_2})$
$D_{FPP}(\vec{V_1})$
$D_{FT}(\vec{V_2})$
$D_{CS}(\vec{V_1})$

FIG. 17

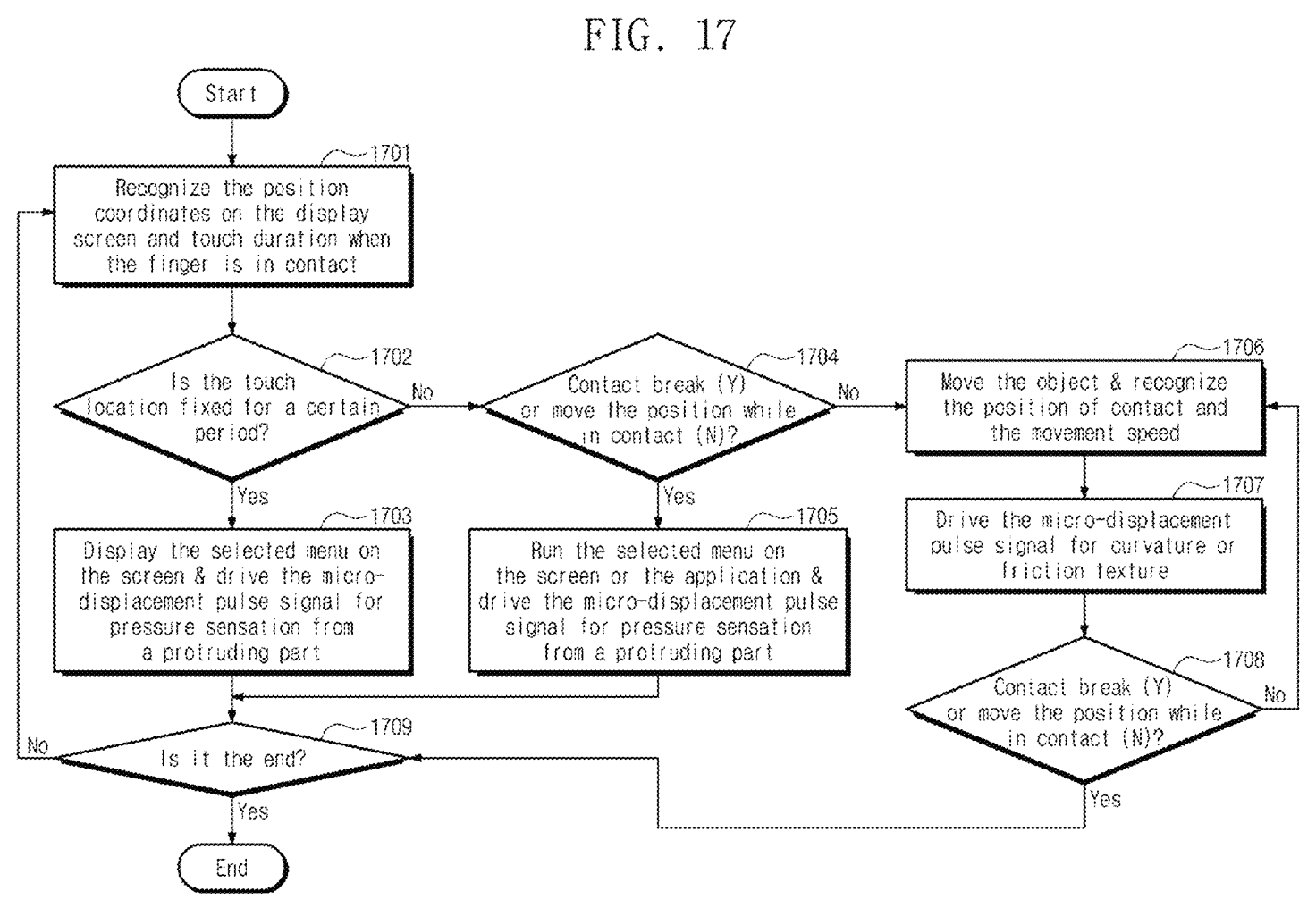

Start

1701 Recognize the position coordinates on the display screen and touch duration when the finger is in contact 1702 Is the touch location fixed for a certain period?

Yes

No

1703 Display the selected menu on the screen & drive the micro-displacement pulse signal for pressure sensation from a protruding part 1704 Contact break (Y) or move the position while in contact (N)?

Yes

No

1705 Run the selected menu on the screen or the application & drive the micro-displacement pulse signal for pressure sensation from a protruding part 1706 Move the object & recognize the position of contact and the movement speed 1707 Drive the micro-displacement pulse signal for curvature or friction texture 1708 Contact break (Y) or move the position while in contact (N)?

Yes

No

1709 Is it the end?

Yes

No

End

FIG. 22

$D_T(t)$ during the movement of the object after the object selection time $t_0$ (x,y,z)

(x',y',z')

$D_T(t)$

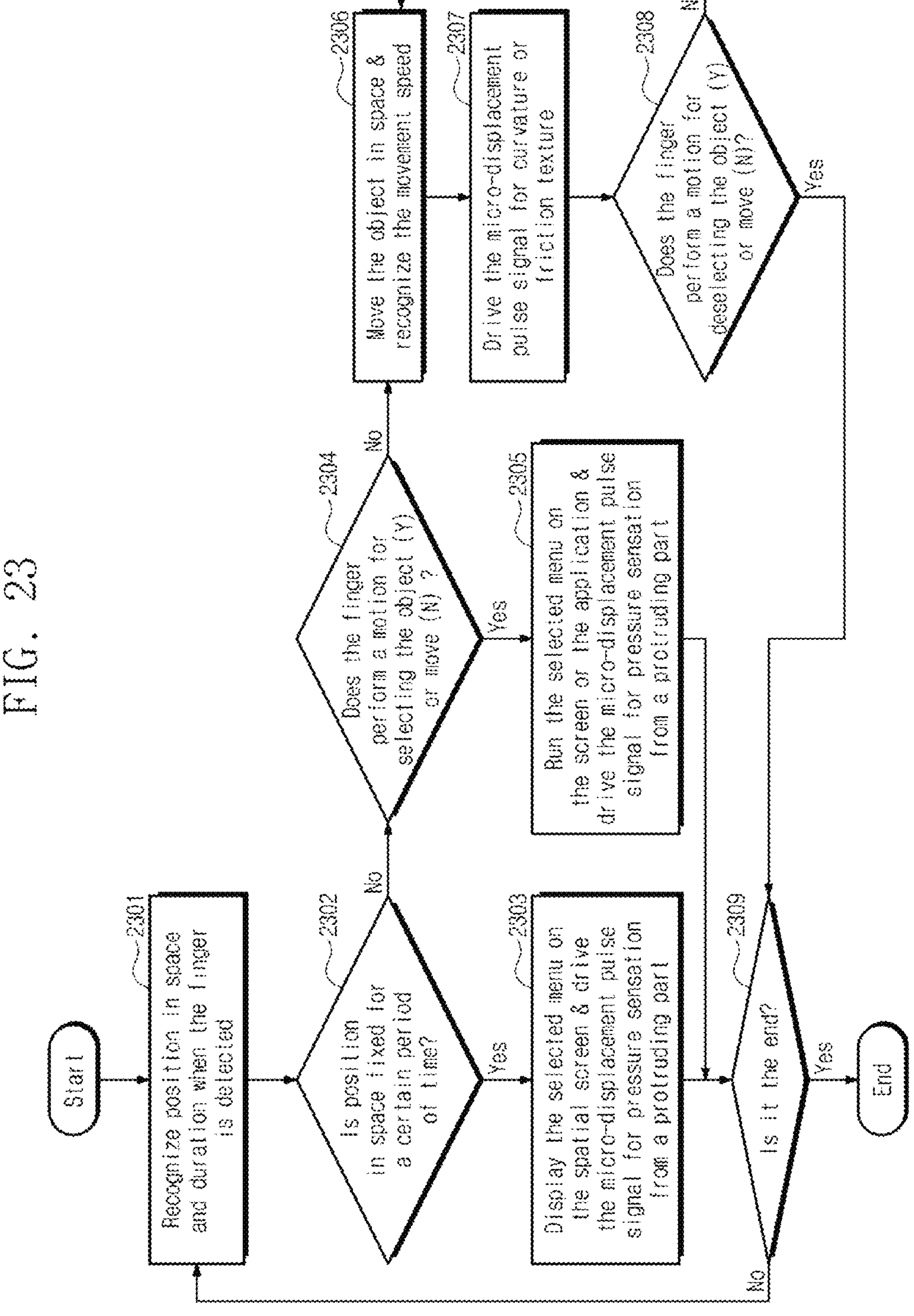
FIG. 23
Start
Recognize position in space and duration when the finger is detected
2301
Is position in space fixed for a certain period of time?
2302
Yes
No
Display the selected menu on the spatial screen & drive the micro-displacement pulse signal for pressure sensation from a protruding part
2303
Does the finger perform a motion for selecting the object (Y) or move (N) ?
2304
Run the selected menu on the screen or the application & drive the micro-displacement pulse signal for pressure sensation from a protruding part
2305
Move the object in space & recognize the movement speed
2306
Drive the micro-displacement pulse signal for curvature or friction texture
2307
Does the finger perform a motion for deselecting the object (Y) or move (N)?
2308
Is it the end?
2309
End

DISPLAY TERMINAL, VIRTUAL TACTILE DEVICE, AND VIRTUAL TACTILE SYSTEM INCLUDING THEREOF

CROSS-REFERENCE TO RELATED APPLICATIONS

This application claims priority under 35 U.S.C. § 119 to Korean Patent Applications No. 10-2024-0092632 filed on Jul. 12, 2024 and No. 10-2024-0186241 filed on Dec. 13, 2024, in the Korean Intellectual Property Office, the disclosures of which are incorporated by reference herein in their entireties.

BACKGROUND

1. Field of the Invention

In recent years, as interest and demand for metaverse products and services such as Virtual Reality (VR), Augmented Reality (AR), and Mixed Reality (MR) have increased, research into technologies for virtually implementing the five senses perceived by users has also grown.

2. Description of Related Art

Realizing a practical tactile sensation, such as actually touching and moving an object, on a two-dimensional planar display (e.g., a smartphone or touchscreen) or a three-dimensional spatial display terminal (e.g., an immersive VR headset) is very challenging. While technologies for realizing virtual tactile sensations, such as devices that drive vibration elements on a display substrate or wearable forms like gloves, are available, current technologies have the drawback of being unable to effectively realize fine and sophisticated tactile sensations. For instance, it is difficult to reproduce tactile sensations such as a quick protrusion feeling or a frictional texture, which are more advanced than simple vibration sensations that suffer from delayed responses or slow protrusions, and wearing these devices can also be inconvenient.

SUMMARY OF THE INVENTION

According to an embodiment of the present disclosure, a virtual tactile device comprising a finger-wearable neuromorphic micro-displacement stimulation element linked to the position, shape, and assigned physical property information of an object on the display screen, and a virtual tactile system including the device and the display terminal are provided.

The virtual tactile device according to one embodiment of the present disclosure includes a display terminal and a wearable device that receives information about a position, a shape, and a physical property of an object displayed on the display screen, and the user's finger position. In one example, the wearable device includes a micro-displacement stimulation element that is in close contact with the user's finger skin. When the finger wearing the wearable device contacts an object displayed on the display screen or moves on the screen of the display terminal, the micro-displacement stimulation element applies a micro-displacement stimulus to the finger skin, selectively triggering action potentials of multiple tactile receptors in the skin. In coordination with the display terminal's screen, the system can provide tactile feedback, including protruding pressure sensations, curvature, and friction textures.

The virtual tactile device according to one embodiment of the present disclosure includes a wearable device that is worn on the finger and receives information about a position, a shape, and a physical property of an object displayed on the display screen, and the user's finger position. In one example, the wearable device includes a micro-displacement stimulation element in close contact with the finger skin. When the finger wearing the wearable device contacts an object displayed on the display terminal or moves across the display screen, the micro-displacement stimulation element applies a micro-displacement stimulus to the finger skin, selectively triggering action potentials of multiple tactile receptors in the finger skin. In coordination with the display terminal's screen, the system can provide tactile feedback, including protruding pressure sensations, curvature, and friction textures.

A display terminal according to an embodiment of the present disclosure is linked to a virtual tactile device that includes a micro-displacement stimulation element in close contact with the user's finger skin. The display terminal may include a screen that displays objects, a processor that generates information about the position, shape, and physical properties of the objects and the finger position, and a communication unit that transmits this information to the virtual tactile device.

BRIEF DESCRIPTION OF THE DRAWINGS

The above and other objects and features of the present disclosure will become apparent by describing in detail embodiments thereof with reference to the accompanying drawings.

FIG. 1 is a block diagram of a virtual tactile system including a two-dimensional touchscreen display terminal, according to one embodiment of the present disclosure.

FIG. 6 illustrates a micro-displacement stimulus applied to trigger the firing of multiple tactile receptors to allow a person to feel protruding pressure sensations, according to one embodiment of the present disclosure.

FIG. 17 is a flowchart illustrating a process for providing tactile feedback to a user based on a virtual tactile device that includes a display terminal and a micro-displacement stimulation element, according to one embodiment of the present disclosure.

FIG. 22 illustrates a process for providing tactile feedback to a user based on a three-dimensional display terminal, the object displayed on its screen, and the micro-displacement stimulation element of a virtual tactile device, according to another embodiment of the present disclosure.

FIG. 23 is a flowchart illustrating a process for providing tactile feedback to a user based on a three-dimensional display terminal and a micro-displacement stimulation element of a virtual tactile device, according to one embodiment of the present disclosure.

DETAILED DESCRIPTION OF THE INVENTION

Figure 2:
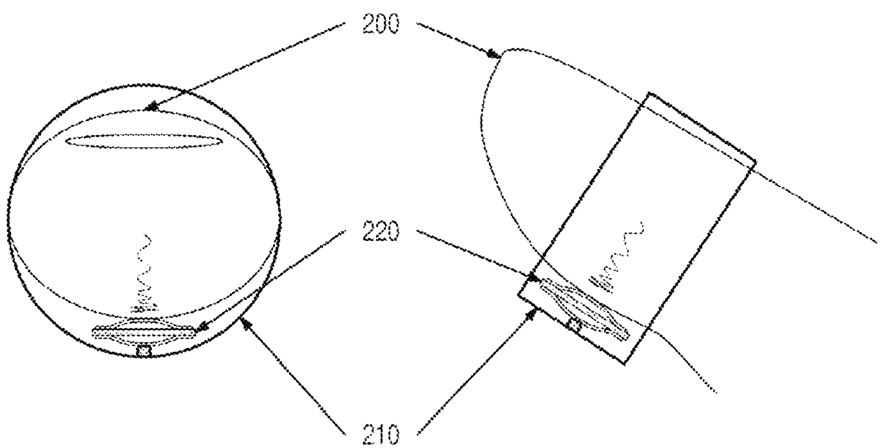
FIG. 2 illustrates a wearable device according to one embodiment of the present disclosure.

Hereinafter, embodiments of the present disclosure will be described clearly and in detail to the extent that a person skilled in the art can easily practice the present disclosure.

Terms such as "unit" and "module" used below or functional blocks shown in the figure may be implemented in a form of a software configuration, a hardware configuration, or a combination thereof. In the following, in order to clearly describe the technical idea of the present invention, detailed descriptions of redundant components are omitted.

As used herein, including in the claims, "or" when used in a list of items (e.g., a list of items prefaced by a phrase such as "at least one of" or "one or more of" or "either or both") indicates an inclusive list such that, for example, a list of at least one of A, B, or C means A or B or C or AB or AC or BC or ABC (i.e., A and B and C)

FIG. 1 is a structural diagram of a virtual tactile system including a two-dimensional touch screen flat display terminal as an embodiment of this document. Both 100 and 110 in FIG. 1 can be referred to as a virtual tactile system and may share core principles with the virtual tactile system of FIG. 20, which will be described later.

The touch screen flat display terminal (100) is widely used in smartphones, tablet computers, desktop computers with touch screen functions, laptop computers (notebook PCs), TVs, remote-controlled CCTVs, as well as touch screen displays and navigation devices for vehicle control and display, and digital signage used in homes or public places, along with monitors for remotely controlled drones, robots, and surgical medical devices. To provide virtual tactile feedback on these displays, a wearable device in the form of a ring, thimble, or glove that can be worn on the finger is integrated, enabling the user to feel protruding pressure, flexion during friction, protrusion, or fine textures when the finger contacts or moves on the touch screen.

In one embodiment, the display terminal (100) may include a touch screen display (101), a CPU (102), a communication unit (103), memory (104), and a power supply (105). The display terminal (100) can be operated through the central signal processing processor CPU (102) with a mounted touch screen display (101). The display terminal (100) incorporates a communication unit (103) such as a short-range wireless communication interface module like Bluetooth, RF, Zigbee, Wi-Fi, Z-wave or mobile telecommunications (3G, LTE, 5G), allowing it to transmit physical property information, including the position, shape, and elastic coefficient of objects stored in the memory device (104), from the display terminal (100) to the virtual tactile device (110). For example, objects may include the finger contact position on the display, and items such as apps, folders, files, menus, text, images, buttons, keyboards, dials, slide bars, notes, divided areas, and objects on the display image.

The virtual tactile device (110) may include a micro displacement stimulus element (111), a signal processing unit (112; DSP), a communication unit (113), memory (114), and a battery (115). The virtual tactile device (110) is configured as a wearable device and may take the form of a ring worn on the finger, equipped with one or more micro displacement stimulus elements (111) and operable through the signal processing unit (112; DSP). The virtual tactile device (110) receives information transmitted from the display terminal (100) via the communication unit (113), such as a short-range wireless communication interface module like Bluetooth or Wi-Fi, stores it in the memory device (114), and utilizes this information to apply micro displacement pulse stimuli through the micro displacement stimulus element (111) to provide virtual tactile sensations. Concerning the terminology used in this document, a micro displacement stimulus element may be replaced with a micro displacement element.

The display terminal (100) may receive power energy through a power supply (105) via a battery or power line, while the virtual tactile device (110) may incorporate a battery (115) internally. In another embodiment of this document, the display terminal (100) and the virtual tactile device (110) may be connected to each other by wire to transfer power energy, or power energy may be transmitted through a wireless power transfer device, without limiting the scope of this document.

FIG. 2 illustrates a wearable device according to an embodiment of this document. The wearable device depicted in FIG. 2 may constitute the virtual tactile device 110 shown in FIG. 1. As shown in FIG. 2, a micro-displacement stimulation element 220 is installed inside a ring 210 worn on a finger 200. The micro-displacement stimulation element 220 applies micro-displacement pulse stimuli to the skin beneath the contacted finger, thereby generating action potential spikes in the tactile nerve, allowing the user to perceive a virtual tactile sensation.

The ring 210 can be worn on any finger, including the index finger, and may be positioned in front of the first, second, or third joint depending on its size, although this document does not limit it to any specific case. The ring may be made from various materials such as metal, ceramic, plastic, or wood.

In one example, the micro-displacement stimulation element 220 may include a piezo actuator element with a rapid response time and minimal delay to facilitate pulse stimulation. Devices like ERM (Eccentric Rotary Mass) or LRA (Linear Resonant Actuator) have inherent delays and slower response times, making it challenging to apply pulse stimuli with varying time periods. Piezo actuators are capable of generating micro-displacements in the range of 1-50 micrometers with no delay and quick response times within 0.1 milliseconds. Additionally, the piezo actuator is designed in a small area and thin film form, allowing easy integration into rings or thimbles, making it suitable for a virtual tactile sensation device as per an embodiment of this document. A stacked structure may be employed to produce significant displacement with minimal voltage, and structures such as cymbals or springs may be incorporated to amplify the displacement magnitude.

The micro-displacement stimulation element 220 may feature a protruding structure to facilitate adhesion to the ring 210, as well as a protruding structure designed for effective application of micro-displacement stimuli to the finger skin, without limitation herein. The micro-displacement stimulation element 220 may be configured and utilized such that two or more elements can be mounted in an array on the wearable device. Each element can be driven by individual micro-displacement pulse signals when the finger is stationary or moving on the display, providing a more refined and precise tactile sensation on the finger's skin. Furthermore, the micro-displacement elements may be protected and packaged within a stretchable thin film to prevent exposure to sweat, water, and humidity, thereby avoiding performance degradation or damage, and to ensure no contamination or harm to human skin from the micro-displacement element. The structure and material of such protective films are not limited by the embodiments of this document.

Figure 3:
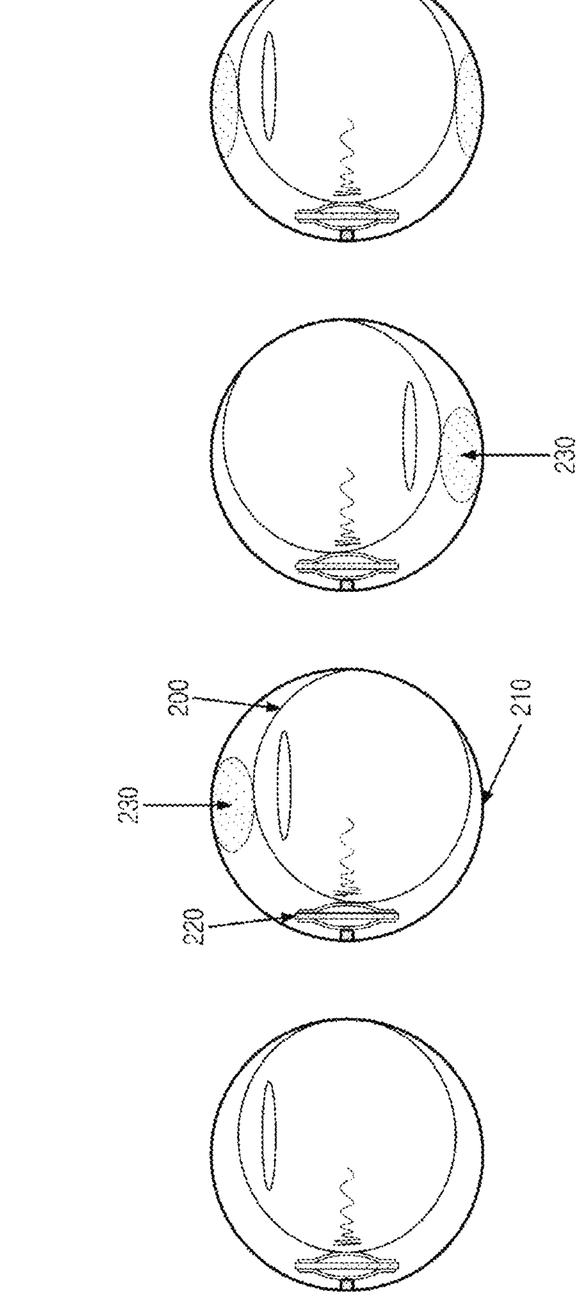
FIG. 3 illustrates a detailed view of the micro-displacement stimulation element and cushion in a wearable device, such as a ring, according to one embodiment of the present disclosure.

FIG. 3 provides a detailed illustration of a micro-displacement stimulation element and a cushion within a ring, which serves as a wearable device in an embodiment of this document. Specifically, FIG. 3 is a conceptual diagram depicting a structure where a micro-displacement stimulation element 220 is adhered inside a ring 210 worn on a finger 200. This configuration facilitates better adhesion by applying micro-displacement pulse stimulation to the skin on the side of the finger, thereby igniting an action potential spike signal in the tactile nerve. To prevent the ring from shaking or slipping off the finger, a cushion 230 made of stretchable material may be adhered inside the ring. This cushion can be adhered to one or both surfaces, considering ease of manufacture and wearing. Materials used may include silicone, PMDS, PMMA, Ecoflex, elastomer, urethane, polyacrylic, styrofoam, rubber, stretchable fiber, among others.

Figure 4:
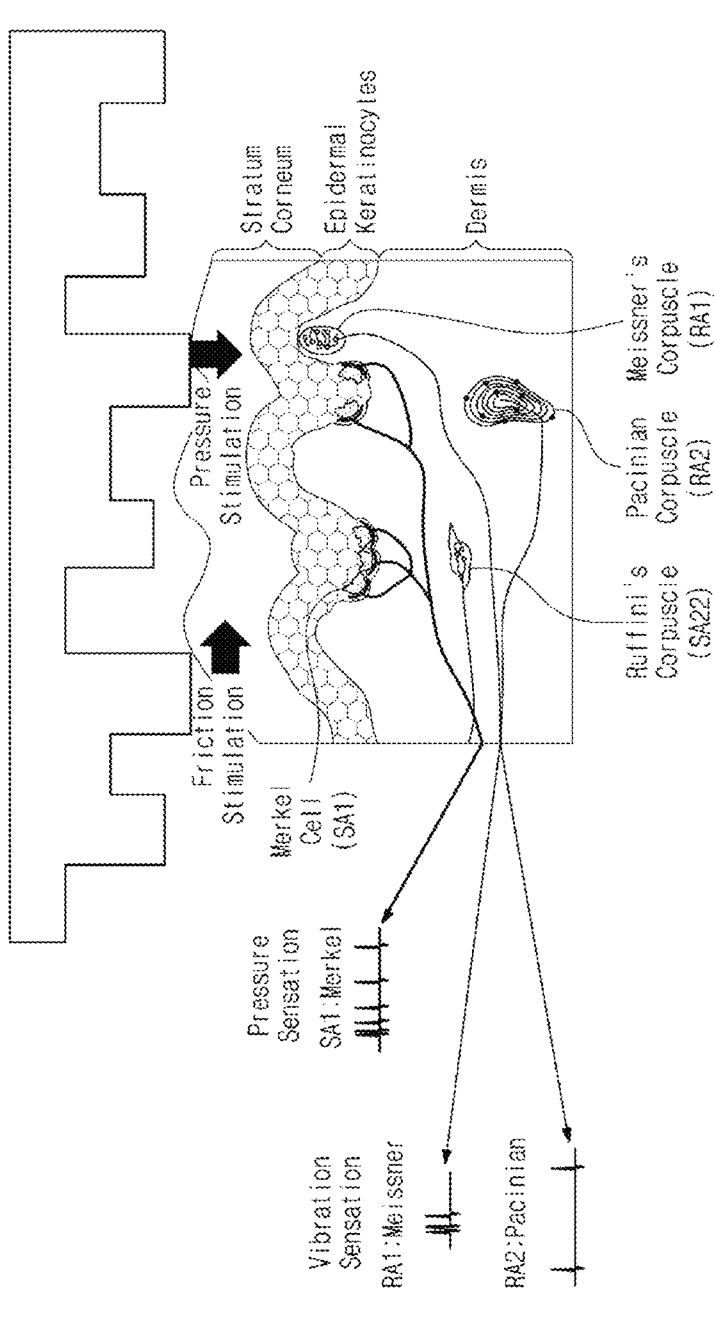
FIG. 4 is a diagram explaining the multiple tactile receptors distributed in the skin.

FIG. 4 illustrates a plurality of tactile receptors distributed across the skin. As shown in FIG. 4, among the tactile receptors distributed on the skin are slow-reacting receptors (SA) and rapid-reacting receptors (RA), including Merkel cells (SA1) that primarily sense pressure, Ruffini endings (SA2) that detect skin stretching, Meissner corpuscles (RA1) that sense weak and slow vibrations or friction, and Pacinian corpuscles (RA2) that detect strong and fast vibrations.

When applying stimuli related to fine surface structure and frictional texture, the pattern of neuronal action potentials varies by location and type at each receptor. Merkel cells (SA1) or Meissner corpuscles (RA1), located closest to the skin's epidermis, respond to fine contact, friction, and pressure stimulation, generating firing signals with unique characteristics. Ruffini endings (SA2) and Pacinian corpuscles (RA2), located deeper within the epidermis, generate firing signals in response to skin stretching due to strong contact or pressure, or strong and rapid vibrations, each with distinct signal characteristics. Further details will be provided in the descriptions of FIGS. 5 to 9.

Among these, protruding pressure sensations, which detect stimuli from protruding objects, are primarily discerned as patterns of spike signals in Merkel cells (SA1) based on pressure magnitude, after contact is detected by Meissner corpuscles. Fine friction textures occurring as a finger moves in contact with a surface are mainly recognized as patterns of spike signals in Meissner corpuscles (RA1).

Strong and fast vibrations are primarily sensed through Pacinian corpuscles (RA2). While the focus here is on selective nerve firing stimulation involving tactile receptors such as Merkel cells (SA1), Meissner corpuscles (RA1), and Pacinian corpuscles (RA2), the description of selective micro-displacement pulse stimulation targeting other tactile receptors, such as Ruffini endings (SA2), is not excluded from the embodiments of this document. This document does not impose limitations on such descriptions.

Figure 5:
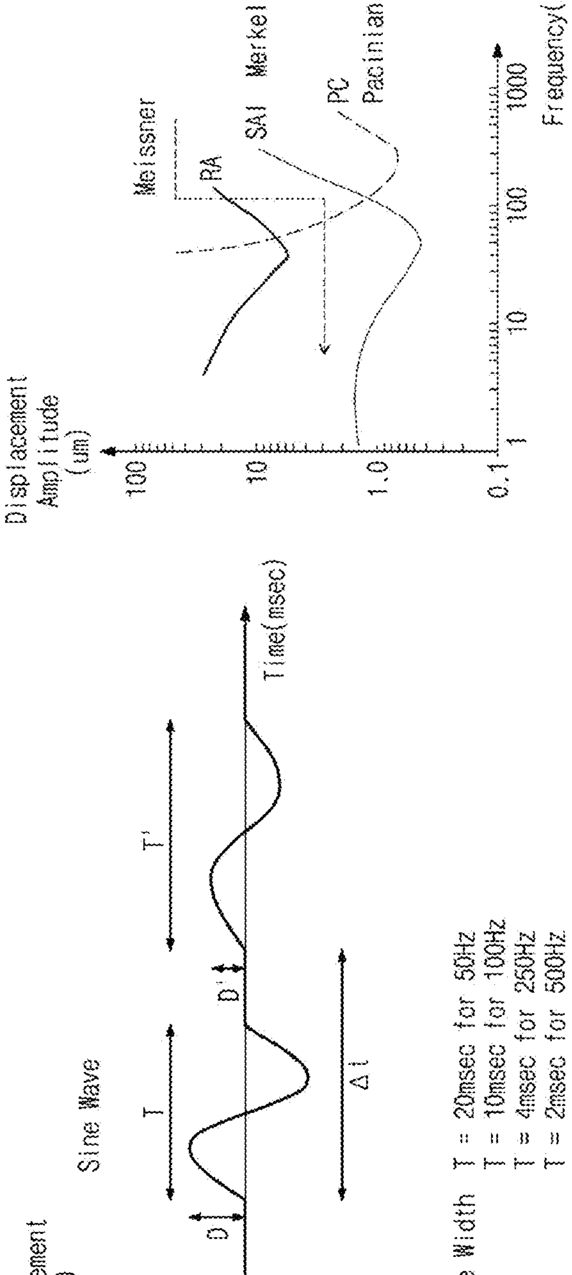
FIG. 5 illustrates the neural action potential spike range triggered in multiple tactile receptors when a sine wave micro-displacement stimulus is applied.

FIG. 5 illustrates the range of neural action potential spike firing generated in various tactile receptors when a sine wave micro-displacement stimulus is applied. Specifically, FIG. 5 depicts the threshold condition range in which neural action potential spike firing is induced in Merkel cells (SA1), Meissner corpuscles (RA1), and Pacinian corpuscles (RA2) according to frequency and amplitude when a sine wave micro-displacement stimulus is applied. In this document, micro-displacement sinusoidal pulse signals of 100 micrometers or less may be employed, utilizing techniques to selectively induce action potential spike firing in tactile receptors. The pulse width T of the sine wave pulse signal corresponds to the temporal length of a single sine wave, D represents the amplitude of the sine pulse, and Δt indicates the time interval between sine wave pulses.

Merkel cells (SA1), which exhibit slow response characteristics, are capable of spike firing at the lowest amplitude of approximately 300 nanometers for sine wave displacements of 30 to 50 Hz, and display spike firing across a broad range of 1 to 300 Hz when subjected to amplitudes of several micrometers. Meissner corpuscles (RA1), with fast response characteristics, exhibit spike firing when an amplitude of 5 micrometers or more is applied to sine wave displacements of 30 to 50 Hz, and do not exhibit spike firing in the range of 1 to 200 Hz for amplitudes of 5 micrometers or less. Pacinian corpuscles (RA2), characterized by strong and rapid response properties, ignite spikes at amplitudes of 1 micrometer or more when subjected to sine wave displacements of 200 to 300 Hz, but do not fire spikes when amplitudes of approximately 2 micrometers or less are applied at 100 Hz or less. Additionally, since neural action potentials are fired at time intervals equal to the pulse width T or the time interval Δt between pulses, there is potential to adjust the time interval between neural action potential firing spikes by modifying the width of the applied micro-displacement pulse or the time interval between pulses (Reference 1: A. Iggo, Sensory receptors in the skin of mammals and their sensory functions, Rev. Neurol. V141, no 10, pp 599~613, 1985).

With a pulse width T of 20 milliseconds corresponding to a sine wave frequency of 50 Hz, micro-displacement pulse stimulation may be applied such that action potential nerve spike firing is unlikely to occur in Meissner corpuscles (RA1), while it is more likely in Merkel cells (SA1) for micro-displacement pulses with amplitudes of 5 micrometers or less.

With a pulse width T of 10 milliseconds corresponding to a sine wave frequency of 100 Hz, nerve spike firing is unlikely in Meissner corpuscles for micro-displacement pulses with amplitudes of 1 to 10 micrometers, while nerve spike firing can occur in both Merkel cells and Pacinian corpuscles. By adjusting the pulse width and amplitude of the micro-displacement pulse stimulation and the time interval between pulses, nerve spikes can be fired in Merkel cells and Pacinian corpuscles for micro-displacement pulses with amplitudes of 10 micrometers or more at frequencies of 100 Hz or more, and primarily in Pacinian corpuscles within a frequency range of 250 to 500 Hz. This enables the induction of neural spike firing for various tactile stimuli, facilitating the realization of virtual tactile sensations.

FIG. 6 exemplifies a micro-displacement stimulus applied to induce firing in various tactile receptors, allowing a person to perceive pressure as if protruding, as an embodiment of this document. Specifically, the figure illustrates a process where a fine micro sinusoidal displacement stimulus is applied in a pattern similar to protruding pressure stimuli on the skin, inducing nerve action potential spike firing in tactile receptors on a one-to-one basis only when fine displacement stimuli are applied. Generally, felt protrusion pressure involves conditions with a protrusion length of at least 1 millimeter and a pressure of 10 kPa or more applied to an area of 1 $mm^2$ with a force of 10 mN, requiring significantly large and complex motor and mechanical components to provide such stimuli.

In one embodiment of this document, micro-displacement pulse stimulation similar to action potential spike signals fired by Merkel cells, Meissner corpuscles, and Pacinian corpuscles can be applied by adjusting the pulse width, amplitude, and time interval of sinusoidal pulses with micro-displacement pulse stimulation of 100 micrometers or less. This approach emulates the sensation of prominent pressure stimuli perceived when a hand contacts an object with visible surface structures. Generally, in Merkel cells, a firing rate pattern with exponential decay ($\exp(-t/\tau)$), where spike firing occurs rapidly ($R_0$) initially upon protrusion pressure stimulus and then decreases rapidly over time, can be obtained. The pattern is similar to a signal pattern where a random firing rate ($R_r$) fluctuates within a certain range around a constant firing rate ($R_a$) after some time.

The time-dependent firing rate value in Merkel cells due to protrusion pressure stimulation can be simulated by Equations 1 or 2 below, with the inter-spike interval (the inverse of the firing rate) used to determine the pulse width and time interval between pulses. In one embodiment of this document, the initial firing rate $R_0$ tends to increase proportionally with applied protruding pressure. For example, the initial firing rate $R_0$ may be set to values ranging from 50 to 1 kHz based on pressure, with the attenuation coefficient $\tau$ set within a range of 0.05 to 0.2 seconds. The constant sustained firing rate $R_a$ and random firing rate $R_r$ may be set within a range of 50 Hz or less. However, these examples do not limit the embodiments of this document.

$$R = R_0 \times e^{-\frac{t}{\tau}} + R_a \quad \text{[Equation 1]}$$

$$R = R_0 \times e^{-\frac{t}{\tau}} + R_a + R_r \times \text{random}(-1 \sim 1) \quad \text{[Equation 2]}$$

In the Meissner corpuscles and Pacinian corpuscles, spikes are triggered only at the initial stage of the protrusive pressure stimulus, and no further spikes are triggered thereafter. As one embodiment of the present disclosure, a micro-displacement pulse signal with equal pulse width and time intervals between pulses in a sine wave form was applied. In another embodiment, it is possible to generate protrusive pressure sensations by adjusting the pulse width to be smaller than or equal to the time interval between pulses. However, the present disclosure does not limit this.

The pulse width and time interval between pulses can be generated using mathematical equations (1) and (2), which are exponential decay functions, to reflect the different firing rates that depend on the pressure magnitude, as mentioned earlier. Additionally, these can be generated using models like the Izhikevich model and the Hodgkin-Huxley model, which simulate neuronal action potentials. Furthermore, the pulse width or time interval between pulses can be derived from neural firing patterns obtained from biological experiments conducted on animals such as rats, cats, monkeys, and humans. The firing patterns from these biological experiments can be directly used, and irregular firing patterns may be generated using random functions to create firing rate signals. However, the present disclosure does not limit this.

By adjusting the pulse width ($D_{PPS}$, $D_n$) and the time interval between pulses of the sine wave pulse as $T_1$, $T_2$, $T_3$, $T_n$, and controlling the micro-displacement accordingly, the firing of action potential spikes in specific tactile receptors such as $S_1$, $S_2$, $S_3$, $S_n$ can be selectively triggered. In this way, a pattern similar to the neural spike firing that occurs when a protruding pressure stimulus is applied can be simulated, allowing the user to perceive a virtual sense of protruding pressure.

Figure 7:
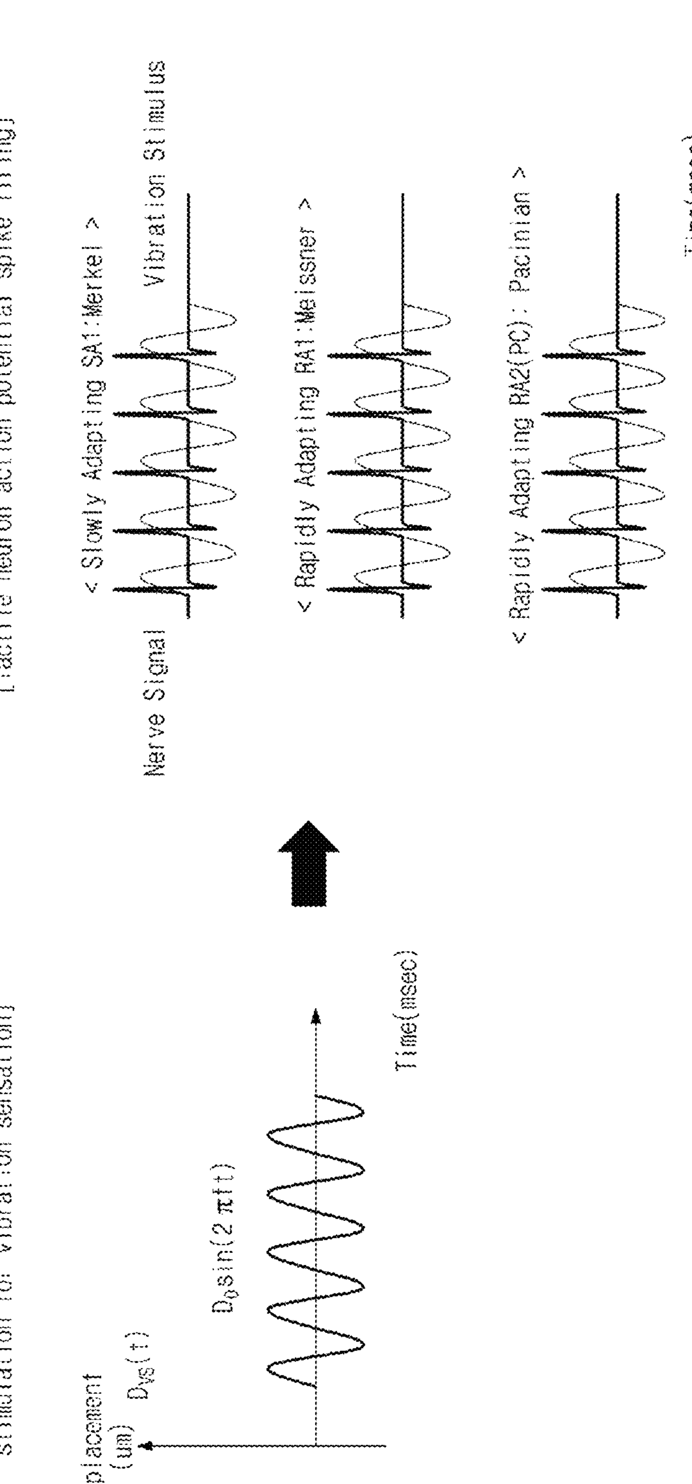
FIG. 7 illustrates the neural action potential spike patterns triggered in multiple tactile receptors when vibrational stimuli are applied to the skin.

FIG. 7 illustrates the neural action potential spike patterns triggered in multiple tactile receptors when vibrational stimuli are applied to the skin. FIG. 7 shows how the neural activity potential spikes are triggered in Merkel cells (SA1), Meissner corpuscles (RA1), and Pacinian corpuscles (RA2; PC) receptors when vibrational stimuli ($D_{Vs}$, $D_0 \sin(2\pi ft)$) and are applied to the skin.

All receptors fire spikes at the same frequency when exposed to a consistent vibrational stimulus with a frequency around 100 Hz. The firing of spikes is selectively triggered depending on the frequency and amplitude. Generally, using an electric motor, such as an eccentric rotating mass (ERM), allows the human skin to feel vibrations, whereas when using a piezoelectric actuator, it is difficult to feel sufficient vibration unless good contact is made. However, when worn on the finger, the micro-displacement pulse stimulation can be well transmitted to the skin, and the pulse stimulus is applied uniformly across the surface in a burst or continuous wave form, allowing for the generation of vibration sensations similar to those obtained from a large vibrating motor.

Figure 8:
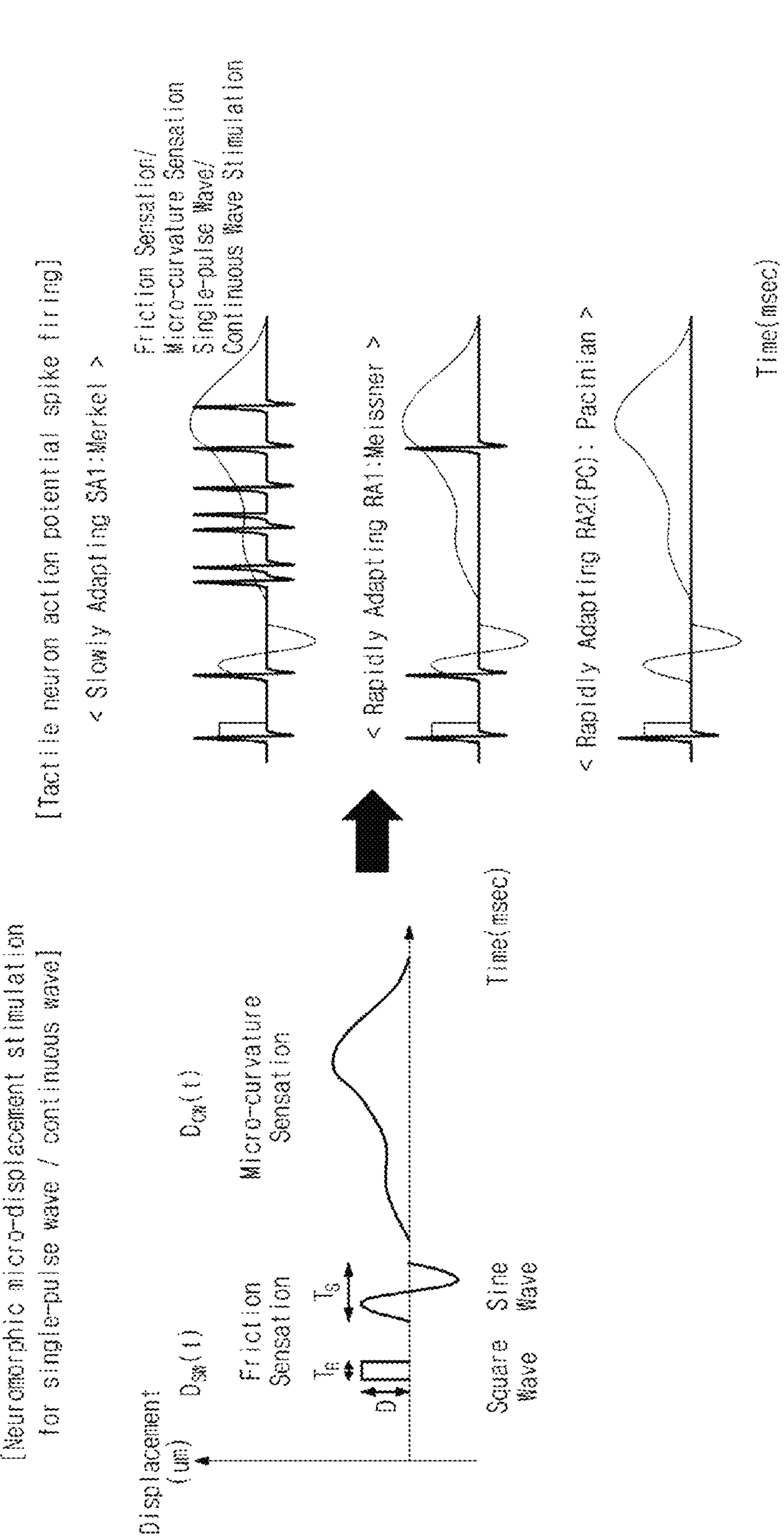
FIG. 8 illustrates the neural firing of multiple receptors caused by pulses according to one embodiment of the present disclosure.

FIG. 8 illustrates the neural firing in multiple receptors due to pulse stimuli according to one embodiment of the present disclosure. The single pulse ($D_{SW}$) described in FIG. 8 can be applied by the micro-displacement stimulation element (111) of FIG. 1. Specifically, a single pulse with a square wave pulse width ($T_R$) or a sine wave pulse width ($T_S$) is applied, or continuous micro-displacement stimulation representing fine curvature is applied, and FIG. 8 shows which neural activity potential spikes are triggered in tactile receptors.

For short pulse stimuli within 4 msec, single neural spikes can be triggered in Merkel cells or Pacinian corpuscles. For slightly longer sine wave pulse stimuli ($D_{CW}$), with a pulse width of 10 msec or more, neural spikes can be triggered only in Meissner corpuscles and Merkel cells, while Pacinian corpuscles may not trigger spikes. In continuous micro-displacement stimuli representing fine curvature, the user may feel as if there are fine curvatures on the surface, and in this case, neural spikes are primarily triggered only in Merkel cells. However, using micro-displacement stimuli with a piezoelectric actuator, slow curvature with displacements under 100 μm can be felt.

Figure 9:
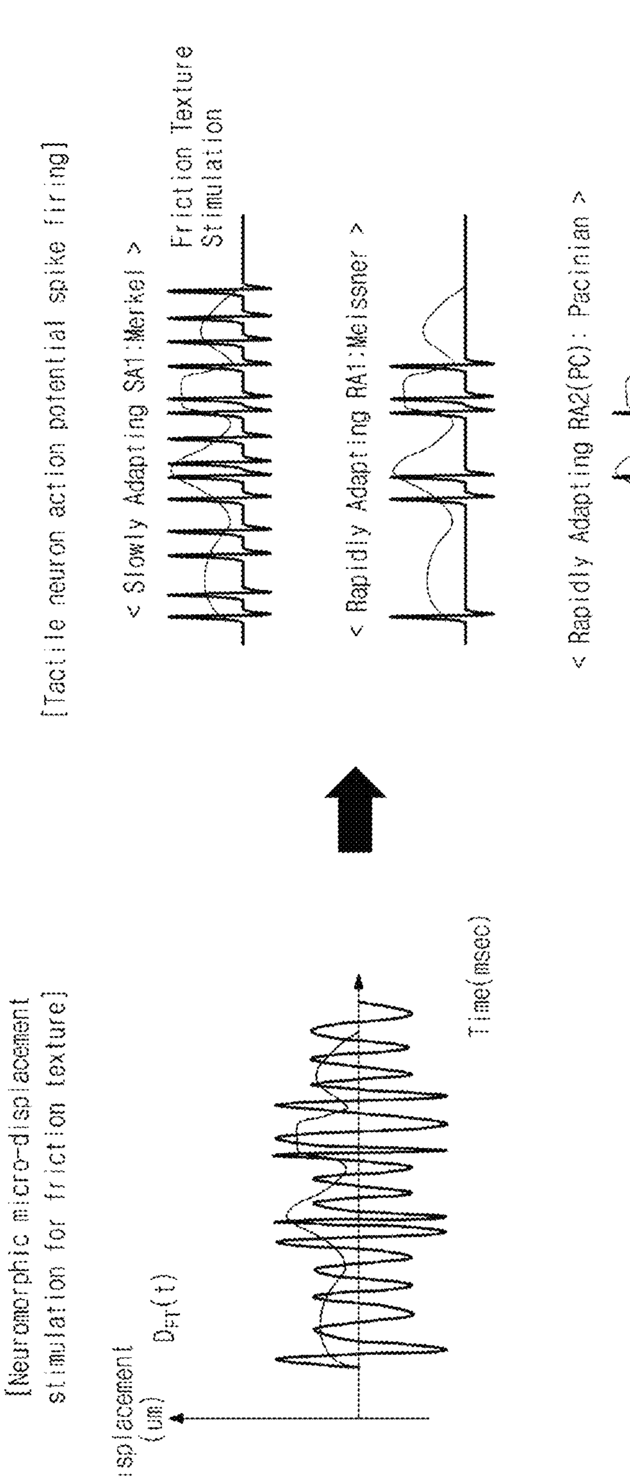
FIG. 9 illustrates the neural action potentials triggered in multiple tactile receptors due to micro-displacement stimuli applied according to one embodiment of the present disclosure.

FIG. 9 illustrates the neural action potentials triggered in multiple tactile receptors due to the application of micro-displacement stimulation, according to one embodiment of the present disclosure. Specifically, FIG. 9 illustrates an example process of generating a virtual friction texture by applying a sine wave pulse-shaped micro-displacement stimulus ($D_{FT}$), where the pulse width and amplitude are varied to control the firing of neural action potential spike patterns in a manner similar to those triggered in specific tactile receptors when a friction texture stimulus is applied. The micro-displacement stimulus in FIG. 9 can be applied by the micro-displacement stimulation element (111) of FIG. 1.

When applying a sine wave pulse with a pulse width corresponding to a high frequency, if the displacement amplitude is larger than 10 μm, spikes can be triggered in both Pacinian corpuscles and Meissner corpuscles. For a sine wave pulse with a pulse width of 10 msec at a frequency of 100 Hz, spikes may only be triggered in Meissner corpuscles, while no spikes may be triggered in the Pacinian corpuscle tactile receptors. Moreover, for a sine wave pulse with a pulse width of 10 msec at a frequency of 100 Hz and an amplitude lower than 10 μm, no spikes are triggered in the Meissner corpuscles, and spikes may only be triggered in Merkel cells.

By adjusting the pulse width and amplitude of the micro-displacement pulse stimulation, the spikes in tactile receptors can be selectively triggered, creating a virtual friction texture that mimics the spike patterns generated during friction.

Figure 10:
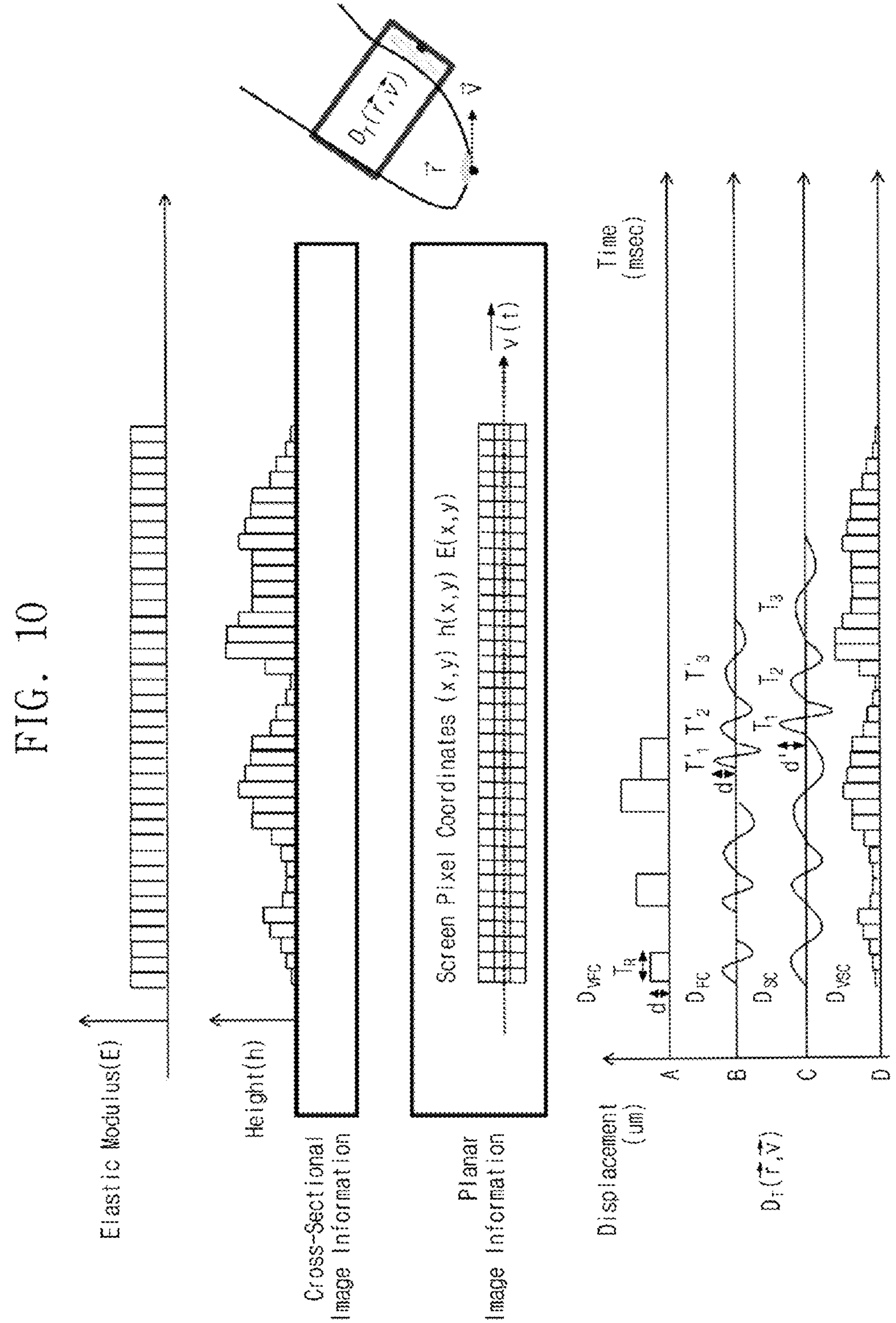
FIG. 10 illustrates a process for providing frictional texture feedback to a user based on a display terminal and a micro-displacement stimulation element of a virtual tactile device, according to one embodiment of the present disclosure.

FIG. 10 illustrates a process for providing frictional texture feedback to a user based on a virtual tactile device that includes a display terminal and a micro-displacement stimulation element, according to one embodiment of the present disclosure. Specifically, FIG. 10 shows a process where, based on the position coordinates (x, y) and the height information (h(x, y)) of an object displayed on the display image, and the elasticity information (elastic modulus) (E(x, y)) due to friction, slow curvature displacement and fast curvature friction displacement are applied as micro-displacement pulse stimuli through the virtual tactile device worn on the finger, depending on the finger's position and movement speed (v(t)) on the display image, allowing the user to feel a virtual friction texture.

According to the shape and physical property information of the object assigned to the display image, when the finger comes into contact and rubs against the object, realistic friction textures can be provided by applying very slow curvature friction displacement ($D_{VSC}$), slow curvature friction displacement ($D_{SC}$), fast curvature friction displacement ($D_{FC}$), and very fast curvature friction displacement ($D_{VFC}$) signals ($D_T$) as shown in FIG. 10, depending on the object's height, elasticity modulus, and the finger's movement speed. In this document, not only is the texture of very slow curvature through micro-displacement stimuli addressed, but also the sequential application of micro-displacement pulse stimuli can sequentially trigger neural action potential spikes in tactile receptors, allowing the user to perceive protruding friction or protruding pressure friction sensations. This can also provide the texture experienced when a surface with curvature or protruding structures of 100 μm or more is rubbed by the finger.

As an embodiment of the present disclosure, at a very slow finger movement speed, the displacement signal corresponding to the curvature of the object based on its position and height is applied, allowing the user to feel a virtual tactile sensation similar to a fine curvature in the image. At a slow finger movement speed, sine wave pulse signals with longer pulse widths can be sequentially applied, with the pulse width and the time intervals between pulses decaying exponentially (T1, T2, T3), including protruding pressure sensations. For faster finger movement speeds, the pulse width and time interval between pulses (T'1, T'2, T'3) can decrease exponentially, and in some cases, non-continuous signals not connected between pulses can be applied. At very fast finger movement speeds, square wave or triangular wave pulses may be applied instead of sine waves, and in this case, the micro-displacement signals can be applied to provide a rough frictional texture on the surface.

Figure 11:
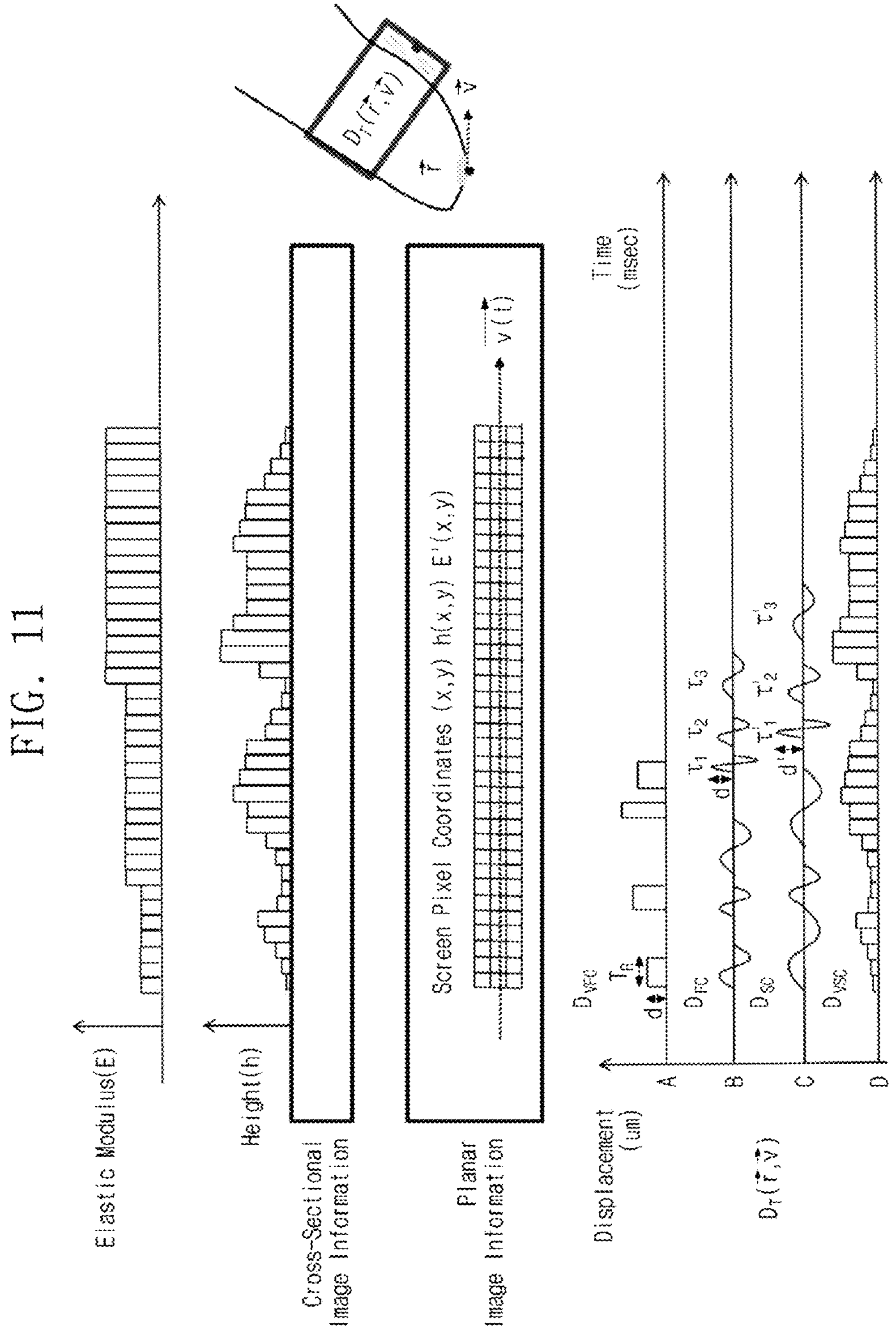
FIG. 11 illustrates a process for providing frictional texture feedback to a user based on a display terminal and a micro-displacement stimulation element of a virtual tactile device, according to another embodiment of the present disclosure.

FIG. 11 illustrates a process for providing frictional texture feedback to a user based on a virtual tactile device that includes a display terminal and a micro-displacement stimulation element, according to another embodiment of the present disclosure. FIG. 11 is similar to FIG. 10, but it shows cases where the elasticity modulus (E'(x, y)) of the object displayed on the display image varies according to the position. It displays very slow curvature displacement ($D_{VSC}$), slow curvature friction displacement ($D_{SC}$), fast curvature friction displacement ($D_{FC}$), and very fast curvature friction displacement ($D_{VFC}$) signals ($D_T$) based on the movement speed of the finger (v(t)). In the case of very slow curvature displacement, the sensations are nearly the same, but as the movement speed increases, the time interval for neural spike activation due to friction becomes shorter in objects with higher elasticity coefficients, enabling more detailed and refined friction textures to be displayed by modulating the sine wave or square wave pulse signals.

Figure 12:
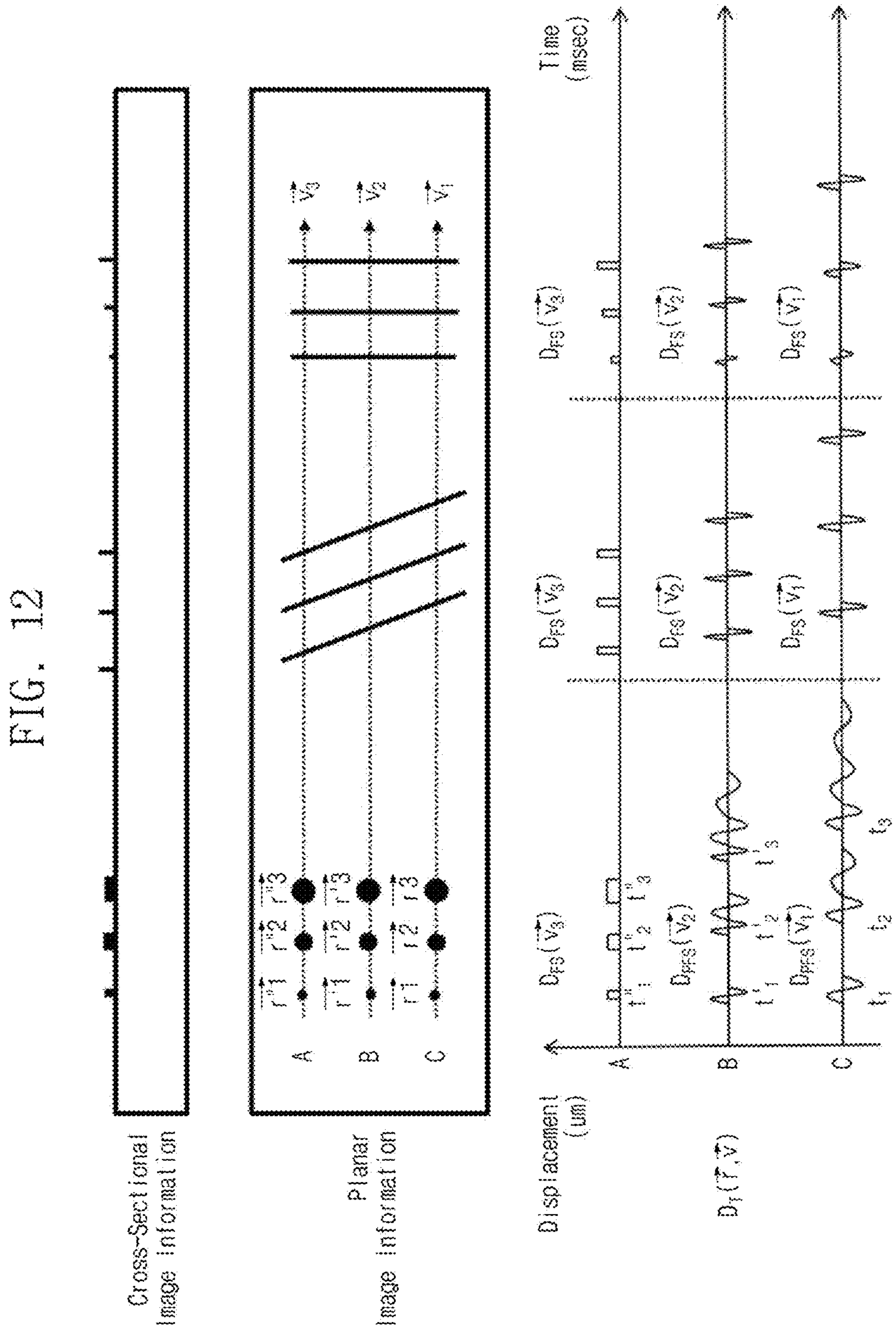
FIG. 12 illustrates a process for providing frictional texture feedback to a user based on a display terminal and a micro-displacement stimulation element of a virtual tactile device, according to another embodiment of the present disclosure.

FIG. 12 illustrates a process for providing frictional texture feedback to a user based on a virtual tactile device that includes a display terminal and a micro-displacement stimulation element, according to another embodiment of the present disclosure. Specifically, FIG. 12 shows a process in which, based on the position and shape of an object (e.g., points, lines, cylinders) displayed on the display image, the micro-displacement pulse stimulation conditions are varied according to the finger's movement speed, thereby enabling the user to feel protruding friction sensations.

In the case of a cylinder, as the diameter of the cylinder increases $$(r_1, r_1', r_1'' \rightarrow r_2, r_2', r_2'' \rightarrow r_3, r_3', r_3''),$$

a sine wave micro-displacement pulse signal, in the form of protruding pressure sensation, can be applied by connecting multiple signals ($D_{FS}(\vec{v}_1)$, $D_{FS}(\vec{v}_2)$, $D_{FS}(\vec{v}_3)$, $D_{PFS}(\vec{v}_1)$, $D_{PFS}(\vec{v}_2)$). When the finger moves slowly ($v_1$), the time intervals between the sine wave pulses ($D_{PFS}(\vec{v}_1)$) are longer ($t_1$, $t_2$, $t_3$). As the movement speed increases ($v_2 \rightarrow v_3$), the time intervals between the pulses ($D_{PFS}(\vec{v}_2)$, $D_{FS}(\vec{v}_3)$) become shorter $$(t_1', t_2', t_3' \rightarrow t_1'', t_2'', t_3'')$$

and the sine wave pulse changes to a square wave ($D_{FS}(\vec{v}_3)$), providing a slightly rougher friction texture.

Figure 13:
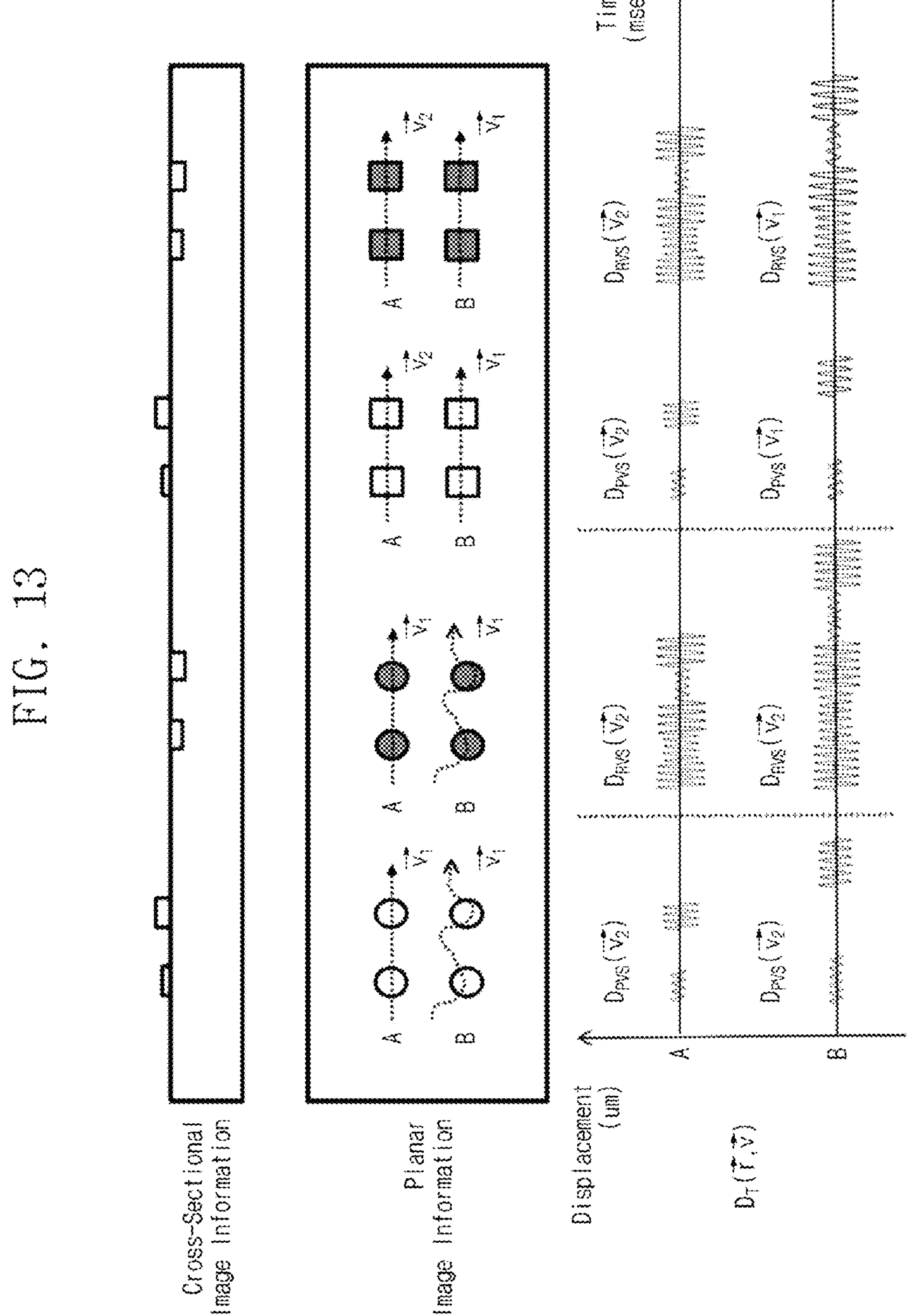
FIG. 13 illustrates a process for providing frictional texture feedback to a user based on a display terminal and a micro-displacement stimulation element of a virtual tactile device, according to another embodiment of the present disclosure.

FIG. 13 illustrates a process for providing frictional texture feedback to a user based on a virtual tactile device that includes a display terminal and a micro-displacement stimulation element, according to another embodiment of the present disclosure. Specifically, FIG. 13 shows a process in which, based on the position and shape of protruding and recessed cylindrical and rectangular objects displayed in the display image, a burst of multiple sine wave micro-displacement pulses is applied according to the finger's movement speed and trajectory, enabling the user to feel protruding vibrations ($D_{PVS}$) and protruding recess ($D_{RVS}$) sensations. When the finger moves at a relatively slow speed ($v_1$), there is no micro-displacement, but when a sine wave burst is applied, the user feels a protruding vibration sensation. When a strong sine wave burst with large displacement is applied, the user feels a protruding sensation, and when a sine wave burst with smaller displacement is applied, the user feels a recessed vibration sensation. At a relatively faster speed ($v_2$), the pulse width of the sine wave can be modulated to decrease inversely proportional to the movement speed, or a constant pulse width sine wave burst signal can be applied, regardless of the movement speed.

Figure 14:
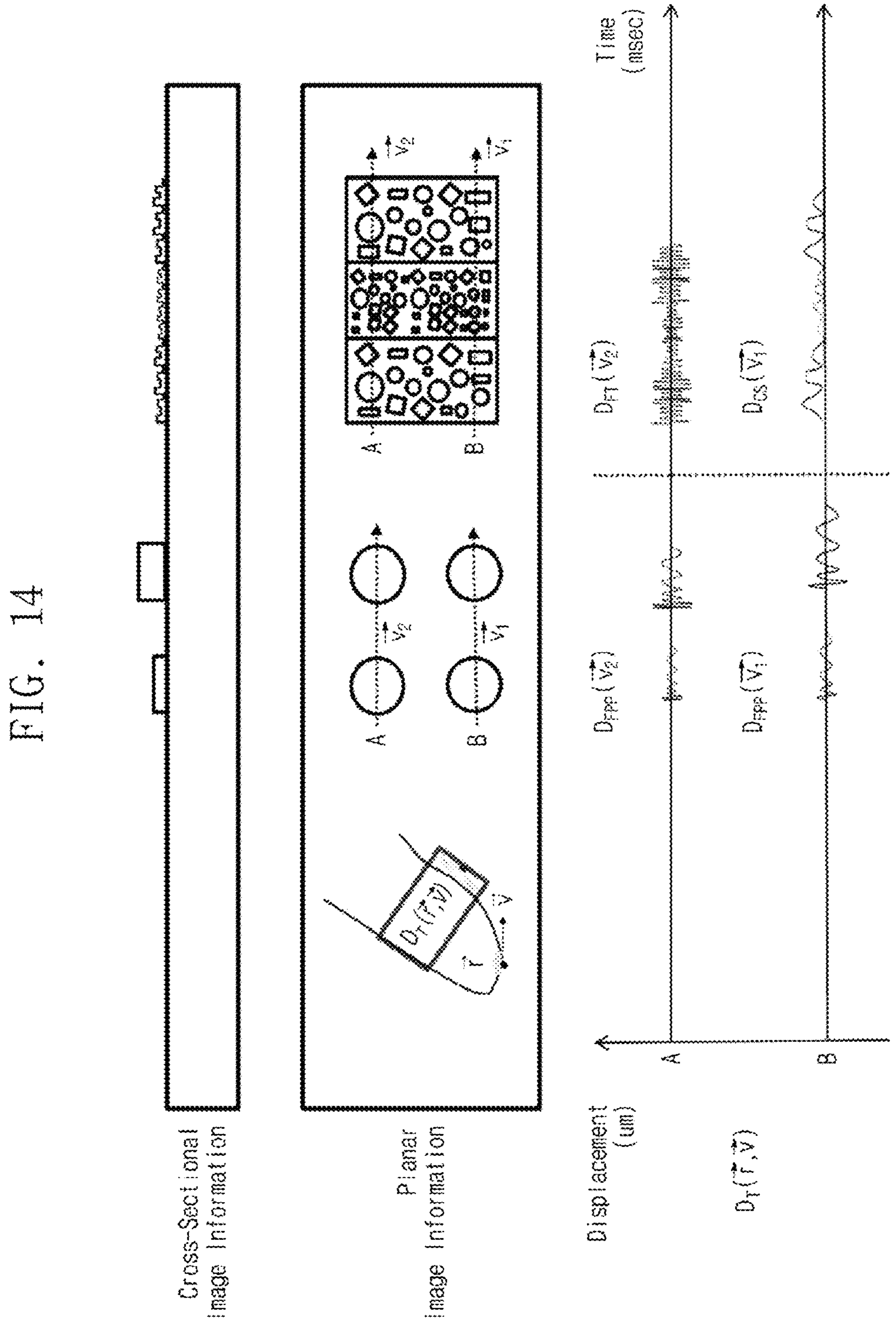
FIG. 14 illustrates a process for providing frictional texture feedback to a user based on a display terminal and a micro-displacement stimulation element of a virtual tactile device, according to another embodiment of the present disclosure.

FIG. 14 illustrates a process for providing frictional texture feedback to a user based on a virtual tactile device that includes a display terminal and a micro-displacement stimulation element, according to another embodiment of the present disclosure. Specifically, FIG. 14 shows a process in which, based on the position and shape of objects with large and small protruding structures displayed on the display image, the sequential conditions of the micro-displacement sine wave pulse signals are varied according to the finger's position and movement speed, allowing the user to feel sensations of frictional protruding pressure ($D_{FPP}$), frictional texture ($D_{FT}$), or curvature ($D_{CS}$).

The embodiment of FIG. 14 is similar to the sine wave micro-displacement pulse signals used to feel protruding pressure sensations, as shown in FIG. 6, but the displacement size is adjusted based on the protrusion height. Alternatively, the finger's movement speed can be used to adjust the pulse width and the time interval between pulses, modulating the frictional protruding pressure sensations ($D_{FPP}$). In the case of objects with small protrusions, when the finger's movement speed is very slow ($v_1$), the user can feel fine curvature sensations corresponding to the surface shape. When the finger's movement speed is faster ($v_2$), frictional textures can be felt through a micro-displacement pulse signal similar to the one shown in FIG. 9.

Figure 15:
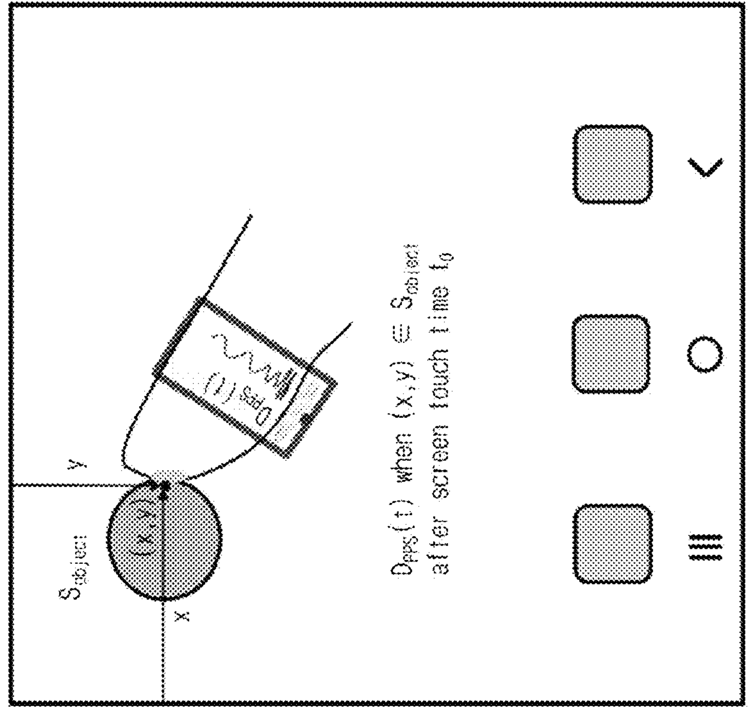
FIG. 15 illustrates a process for providing tactile feedback to a user based on a display terminal, the object displayed on its screen, and the micro-displacement stimulation element of a virtual tactile device, according to one embodiment of the present disclosure.

FIG. 15 illustrates a process for providing tactile feedback to a user based on a display terminal, an object displayed on its screen, and a micro-displacement stimulation element of a virtual tactile device, according to one embodiment of the present disclosure. Specifically, FIG. 15 shows a process where, based on the position and shape information of the object (e.g., apps, folders, menus, buttons, dials, slide bars, etc.) displayed on the display terminal's screen, when the finger's position on the screen is recognized within the range of the object's position ([(x, y)$\in S_{object}$]), a neuromorphic micro-displacement pulse stimulation corresponding to the protruding pressure sensation is applied, enabling the user to feel the tactile sensation of the object protruding from the image. The magnitude of the protruding pressure sensation ($D_{PPS}$), corresponding to the assigned physical property, can be variably controlled by adjusting the pulse width, the time intervals between pulses, and the displacement size. As shown on the right side of the figure, similar protruding pressure sensations can be provided for objects such as menus, buttons and keyboards ($S_{menu}$, $S_{button}$), offering virtual tactile feedback to the user.

Figure 16:
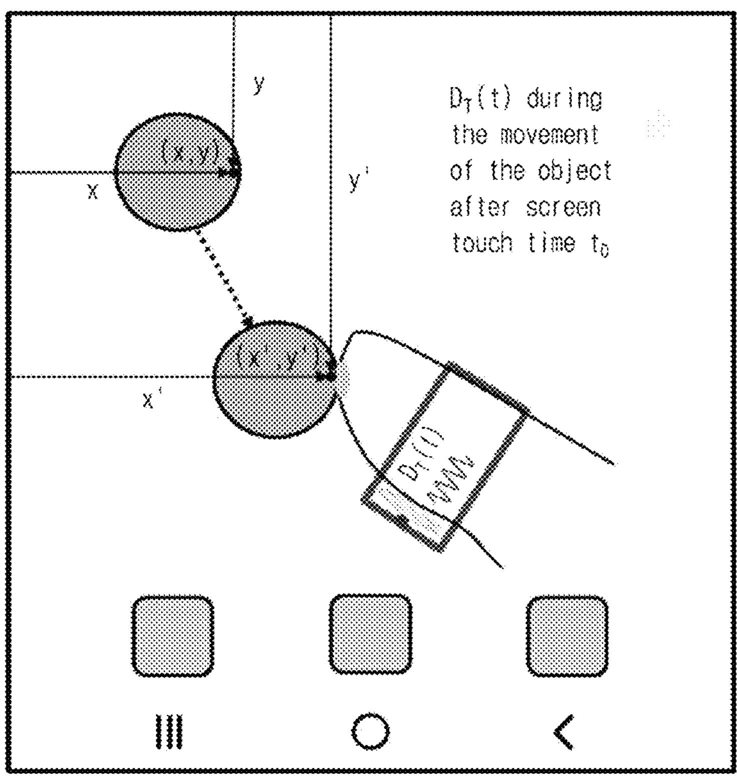
FIG. 16 illustrates a process for providing tactile feedback to a user based on a display terminal, the object displayed on its screen, and the micro-displacement stimulation element of a virtual tactile device, according to another embodiment of the present disclosure.

FIG. 16 illustrates a process for providing tactile feedback to a user based on a virtual tactile device that includes a display terminal and a micro-displacement stimulation element, according to another embodiment of the present disclosure. Specifically, FIG. 16 shows a process in which, based on the position, shape, and elasticity coefficient of an object displayed on the display terminal, the finger touches and selects the object on the screen, and as the finger moves across the object, the texture corresponding to the finger's position and movement speed is displayed through neuromorphic micro-displacement pulse stimulation.

The texture of the movement ($D_T$) can include sensations such as vibration, micro-curvature, protruding friction, and friction textures, but friction sensations in a form that minimizes the battery consumption of the wearable device are preferred. However, the present disclosure does not limit this. Additionally, similar to the note function on smartphones, when the user draws or writes on a note with the finger, it can be used to experience frictional textures similar to writing with a pen or drawing on paper.

FIG. 17 is a flowchart illustrating a process for providing tactile feedback to a user based on a virtual tactile device that includes a display terminal and a micro-displacement stimulation element, according to an embodiment of the present disclosure. Specifically, FIG. 17 shows a flowchart of the process in which, based on the position, shape, and physical property information of an object displayed on the display terminal, the finger contacts or selects the object, or when the object is moved by the finger, the feedback corresponding to the movement is provided to the user through neuromorphic micro-displacement pulse stimulation, such as protruding pressure sensation or texture.

The display terminal (100) and/or virtual tactile device (110) can recognize the position coordinates of the image and the duration of contact when the finger touches the display surface (1701). When the finger remains fixed at the contact position for a certain period (1702), the virtual tactile device (110) can display a selection menu on the image and simultaneously apply the micro-displacement pulse signal corresponding to the protruding pressure sensation (1703).

If the contact position is maintained for less than a certain period and the finger moves (1704), the virtual tactile device (110) can drive the micro-displacement pulse signal corresponding to the protruding pressure sensation while driving the selected menu or app (1705). When the finger moves on the display surface, the display terminal (100) can recognize the position and movement speed of the finger while moving the object on the screen (1706). Accordingly, the virtual tactile device (110) can apply the micro-displacement pulse signal corresponding to curvature or friction texture (1707). When the finger breaks contact with the display surface (1708), the process moves to the next step, otherwise, the process continues with recognizing the position and speed of the finger as it moves the object.

Figure 18:
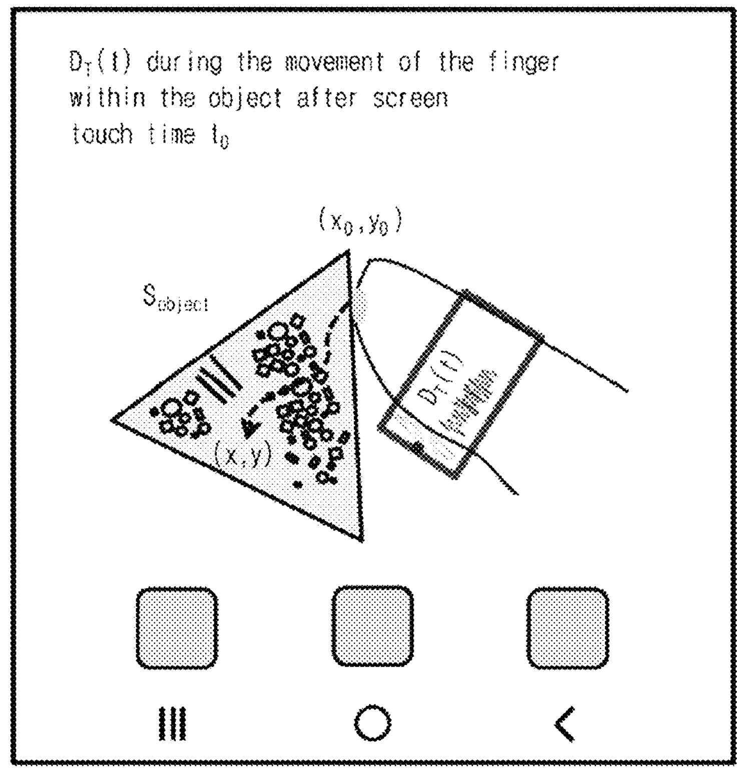
FIG. 18 illustrates a process for providing tactile feedback to a user based on a display terminal, the object displayed on its screen, and the micro-displacement stimulation element of a virtual tactile device, according to another embodiment of the present disclosure.

FIG. 18 illustrates a process for providing tactile feedback to a user based on a virtual tactile device that includes a display terminal and a micro-displacement stimulation element, according to another embodiment of the present disclosure. Specifically, FIG. 18 shows a process in which, based on the position, shape, and elasticity coefficient of an object displayed on the display screen, the finger touches the surface of the object in the image, and as the finger moves across the object, the texture ($D_T$) corresponding to the finger's position and movement speed is displayed through neuromorphic micro-displacement pulse stimulation. The objects in the image can include people, animals, plants, educational materials, shopping products, game characters, braille, text, images, and any other object appearing on the display screen. They can also include protruding and recessed structures, as well as curved structures of dots, lines, and figures.

Figure 19:
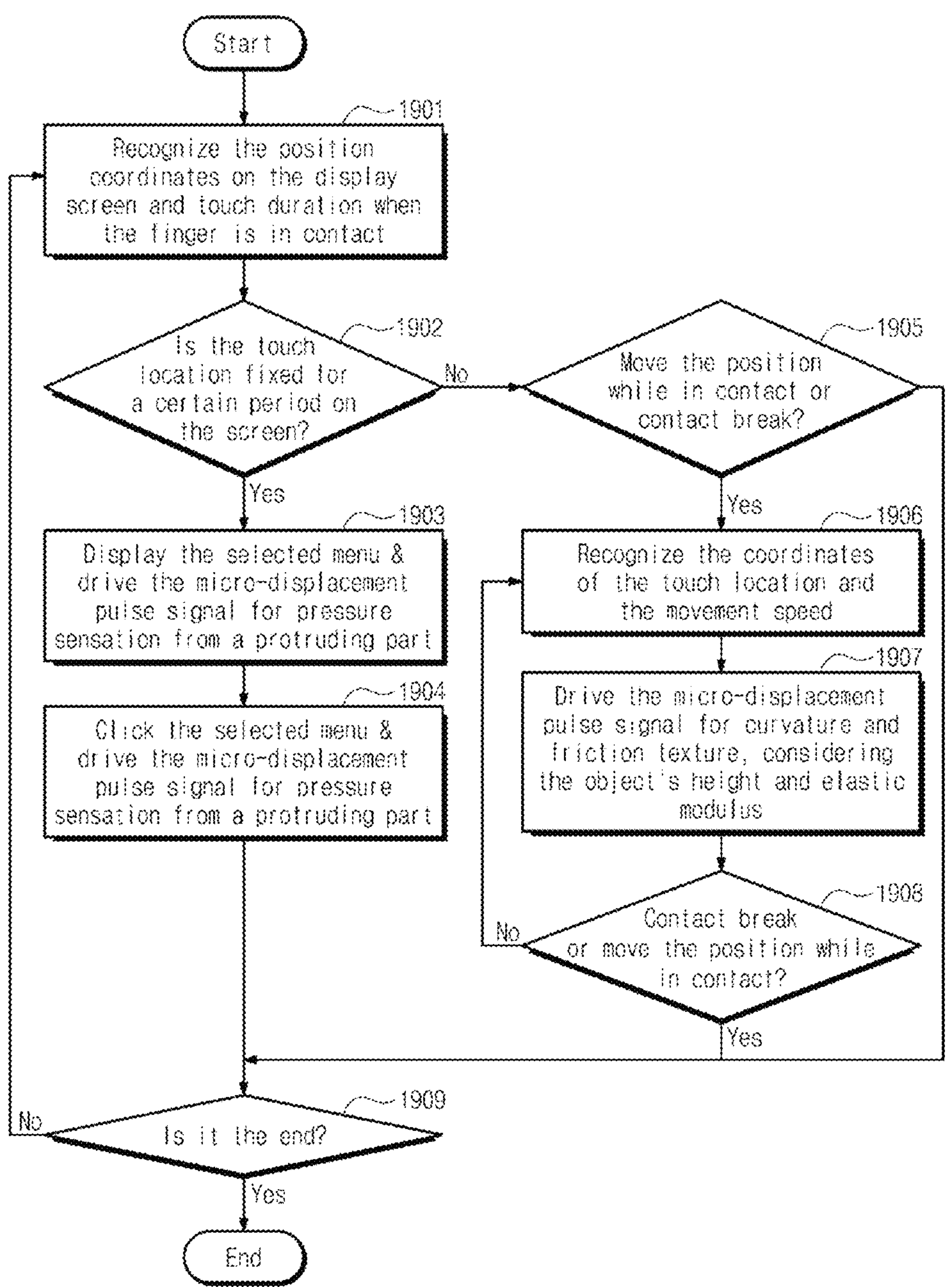
FIG. 19 is a flowchart illustrating a process for providing tactile feedback to a user based on a virtual tactile device that includes a display terminal and a micro-displacement stimulation element, according to another embodiment of the present disclosure.

FIG. 19 is a flowchart illustrating a process for providing tactile feedback to a user based on a virtual tactile device that includes a display terminal and a micro-displacement stimulation element, according to another embodiment of the present disclosure. Specifically, FIG. 19 illustrates a process in which, based on the position, shape, and elasticity coefficient of an object displayed on the display terminal, the finger touches and moves across the surface of the object on the screen, and the texture corresponding to the finger's position and movement speed is displayed through neuromorphic micro-displacement pulse stimulation.

The display terminal (100) and/or virtual tactile device (110) can recognize the position coordinates of the image and the duration of contact when the finger touches the display screen (1901). If the finger remains in contact for a certain period (1902), the display terminal (100) can display a selection menu on the screen, and simultaneously, the virtual tactile device (110) can drive the micro-displacement pulse signal corresponding to the first protrusive pressure sensation (1903). When the user clicks and activates the selection menu, the virtual tactile device (110) can drive the micro-displacement pulse signal corresponding to the second protrusive pressure sensation (1904).

If the finger moves while maintaining contact at the touch position for less than a certain time (1905), the display terminal (100) and/or virtual tactile device (110) can recognize the coordinates of the touch position and the movement speed (1906). The virtual tactile device (110) can drive the micro-displacement pulse signal corresponding to the curvature and friction texture, considering the height and elasticity coefficient of the object (1907). If the user's finger continues to move while maintaining contact (1908), the process of recognizing the touch position coordinates and movement speed can be repeated (1906).

Figure 20:
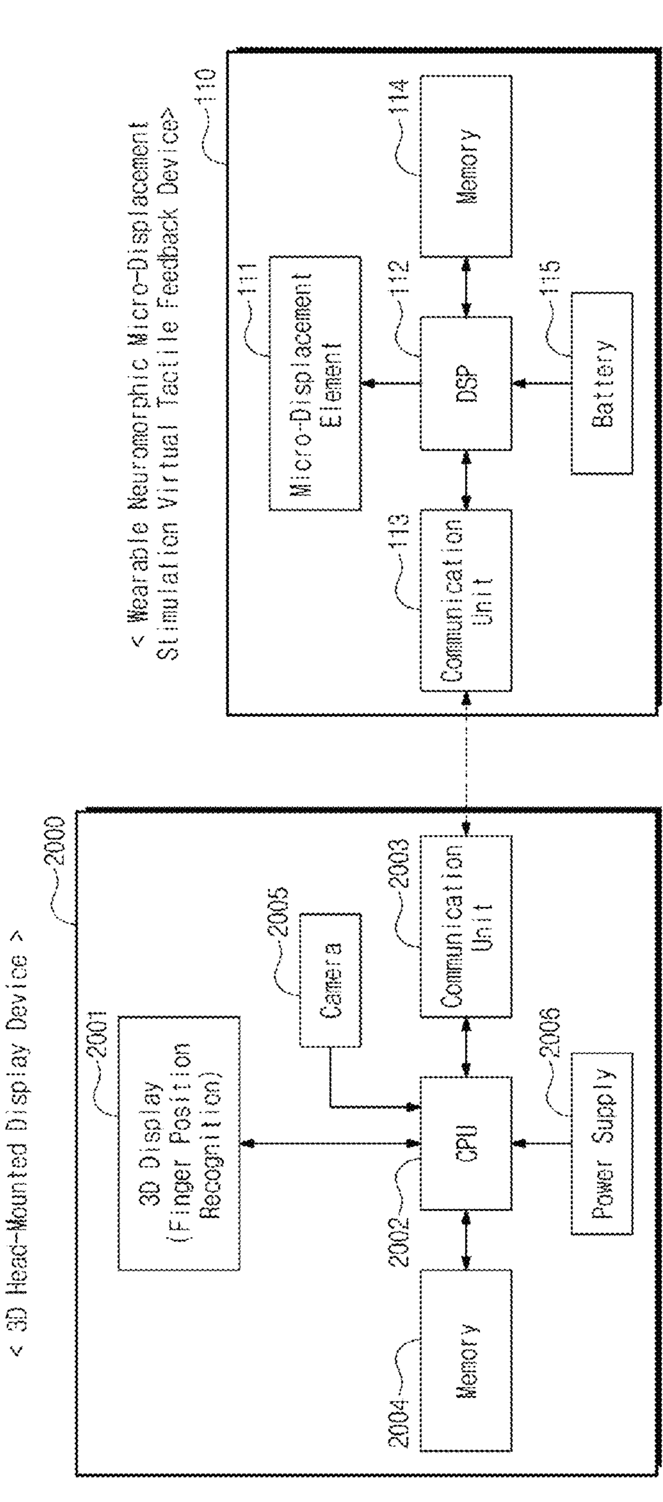
FIG. 20 is a block diagram of a virtual tactile system including a virtual reality three-dimensional head-mounted display terminal, according to one embodiment of the present disclosure.

FIG. 20 is a block diagram of a virtual tactile system that includes a virtual reality three-dimensional head-mounted display terminal, according to one embodiment of the present disclosure. Both 2000 and 110 in FIG. 20 can be referred to as the virtual tactile system, which shares the core principles with the virtual tactile system shown in FIG. 1.

The head-mounted display can provide immersive virtual reality, augmented reality, and mixed reality functions, and can be widely used in remotely controlled drones, robots, and medical device control monitors. As one embodiment, the head-mounted display terminal (2000) can include a three-dimensional spatial display (2001), CPU (2002), communication unit (2003), memory (2004), camera (2005), and power supply (2006). The display terminal (2000) can be operated via a central signal processing processor, the CPU (2002). The display terminal (2000) can incorporate a communication unit (2003), which is a short-range wireless communication interface module, such as Bluetooth or Wi-Fi. The position, shape, and elasticity coefficient information of the object on the spatial display screen (e.g., apps, folders, files, menus, text, images, buttons, keyboards, dials, slide bars, notes, partitioned areas, and objects, etc.), stored in the memory device (2004), and the spatial position information of the finger recognized by the camera (2005) can be transmitted to the virtual tactile device (110), which is a wearable device, via the communication unit (2003) and communication unit (113).

To provide virtual tactile feedback on such a three-dimensional display, a wearable device (110) in the form of a ring, thimble, or glove, which can apply micro-displacement stimulation to the finger, can be linked to the display terminal (2000). The camera (2005) can recognize the shape or position of the finger. The virtual tactile system (including 2000 and 110) is configured to provide tactile feedback, such as protruding pressure sensation, frictional protrusion, or fine texture feedback, to the user when the finger is located within the spatial range of the object on the spatial display or moves across the screen.

As for methods of recognizing the finger's position, the finger's image can be recognized by the camera (2005) and CPU (2002), or the shape of a wearable device (110), such as a ring worn on the finger, can be recognized. It is also possible to distinguish multiple wearable devices by marking them with numbers or symbols, or using LEDs that emit different colors, and recognizing the location of the identified device. This allows for the provision of virtual tactile feedback by associating the recognized location with the spatial display and providing distinct tactile sensations. However, the embodiments in the present document are not limited to these methods.

The virtual tactile device (110) may be in the form of a ring worn on the finger and can include a micro-displacement stimulation element (111) inside. The virtual tactile device (110) operates via a signal processing unit (112; DSP) and can receive information transmitted from the head-mounted display terminal (2000) through a communication unit (113), which is a short-range wireless communication interface module such as Bluetooth or Wi-Fi, and store this information in a memory device (114). Using this information, the virtual tactile device (110) can apply a micro-displacement pulse stimulation through the micro-displacement stimulation element (111) to provide virtual tactile feedback based on the spatial screen to the user.

The head-mounted display terminal can be powered via a power supply unit (2006) through a battery or power cord. The wearable virtual tactile device (110) may include an internal battery (115). As another embodiment, the head-mounted display terminal and the wearable virtual tactile device (110) can be connected by wired communication, transmitting not only the position, shape, and physical property information of objects on the screen but also power energy. Alternatively, power energy may be transmitted through a wireless power transfer device, and the present document does not restrict this.

Figure 21:
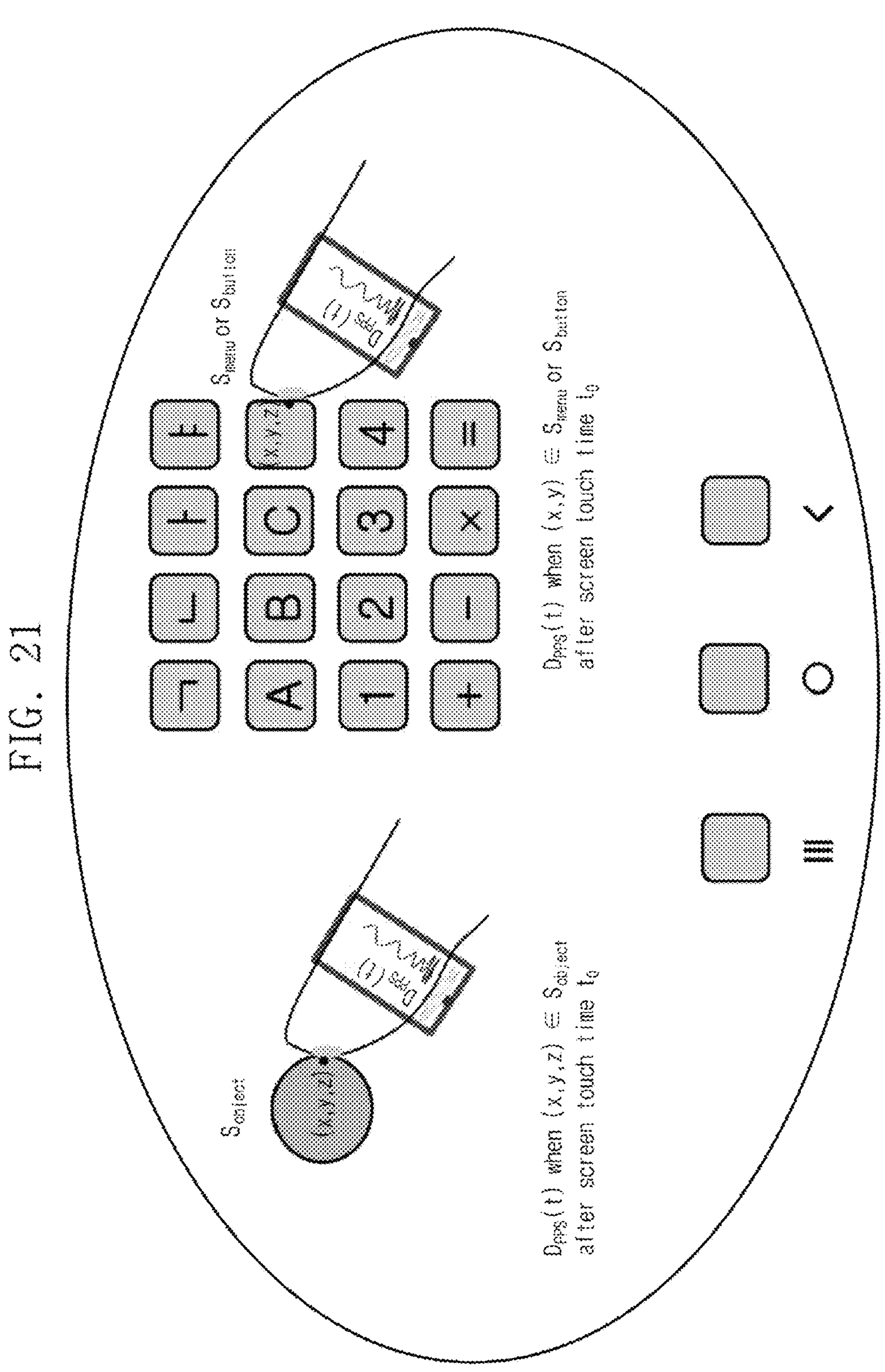
FIG. 21 illustrates a process for providing tactile feedback to a user based on a three-dimensional display terminal, the object displayed on its screen, and the micro-displacement stimulation element of a virtual tactile device, according to one embodiment of the present disclosure.

FIG. 21 illustrates a process for providing tactile feedback to a user based on a three-dimensional display terminal, the object displayed on its screen, and the micro-displacement stimulation element of a virtual tactile device, according to one embodiment of the present disclosure. Specifically, FIG. 21 shows a process where the spatial position of the finger, recognized by the camera, is within the spatial range of the object (e.g., $(x, y, z) \in S_{object}$), and when the finger is located within this range, a neuromorphic micro-displacement pulse stimulation ($D_{PPS}$) corresponding to the protruding pressure sensation is applied, allowing the user to feel a protruding tactile sensation from the object on the spatial screen. The magnitude of the protruding pressure sensation, such as the pressure, can be controlled by adjusting the pulse width, time interval between pulses, and the magnitude of displacement, allowing for variable control. As shown on the right side of FIG. 21, the virtual tactile device (110) can also provide similar protruding pressure sensations for objects like menus, buttons, and keyboards ($S_{menu}$, $S_{button}$) offering virtual tactile feedback to the user.

Figure 22:
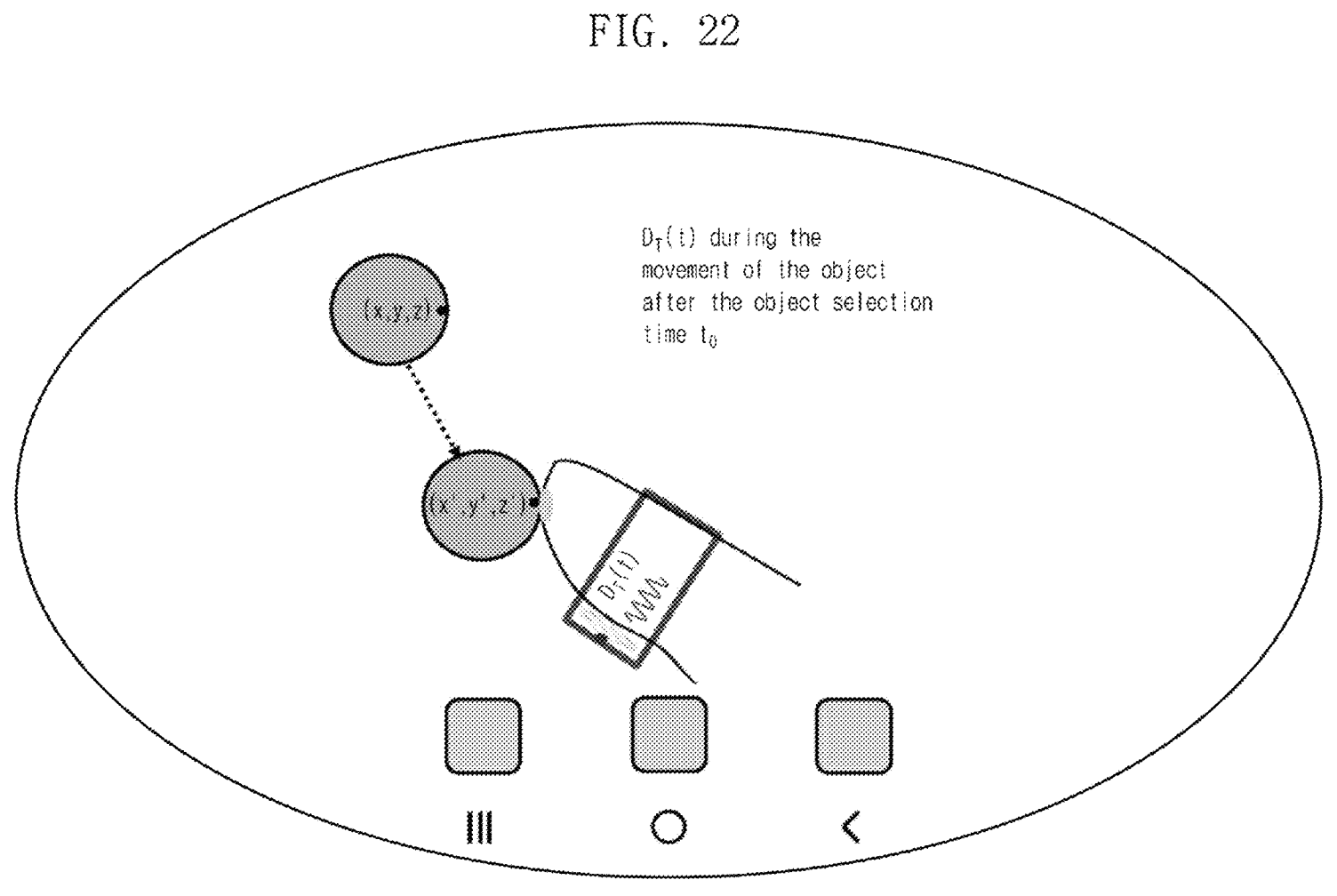

FIG. 22 illustrates a process for providing tactile feedback to a user based on a three-dimensional display terminal, the object displayed on its screen, and the micro-displacement stimulation element of a virtual tactile device, according to another embodiment of the present disclosure. Specifically, FIG. 22 shows a process in which the spatial position and shape information of an object (e.g., apps, folders, menus, buttons, dials, slide bars, etc.) displayed in a head-mounted display, along with the elasticity coefficient and other physical properties, is used to determine the spatial position of the finger, recognized by a camera, within the spatial range of the object. When the finger or another finger performs a motion to select the object, the texture ($D_T$) corresponding to the finger's spatial position and movement speed is displayed via neuromorphic micro-displacement pulse stimulation as the finger moves along the surface of the object in the spatial image. The texture of the movement can include sensations such as vibration, micro-curvature, protruding friction, and friction textures, but friction sensations in a form that minimizes the power consumption of the wearable device's battery are preferred. This is not restricted by the present document. The action recognized as selecting the object can be set as bending the finger, rotating the finger, or placing another finger in contact with the finger that is touching the object. In another embodiment, when pressure is applied to the micro-displacement element, charge is generated in the piezoelectric element, creating a potential difference. Using this sensor signal, or by additionally integrating a pressure detection sensor into the wearable device, when another finger touches the wearable device, it can be recognized as selecting the object. The present document does not restrict this.

FIG. 23 is a flowchart illustrating a process for providing tactile feedback to a user based on a three-dimensional display terminal and a micro-displacement stimulation element of a virtual tactile device, according to one embodiment of the present disclosure. Specifically, FIG. 23 shows a flowchart of a process where the spatial position of a finger, recognized by a camera, is within the spatial range of the object based on the spatial position, shape, and elasticity coefficient of the object displayed in the head-mounted display. When the finger performs a motion to select or move the object, or when the finger moves within the spatial range of the object, the corresponding tactile feedback such as protruding pressure sensation or texture is displayed through neuromorphic micro-displacement pulse stimulation.

The virtual tactile device (110) and/or display terminal (2000) can recognize the spatial position coordinates and duration when the finger, recognized by the camera (2005), is within the spatial range of the object in the spatial image (2301). When the finger's spatial position remains fixed within the object's spatial range for a predetermined time (2302), the virtual tactile device (110) can display a selection menu on the spatial screen and simultaneously drive the micro-displacement pulse signal corresponding to the protruding pressure sensation (2303). When the finger performs a motion to select the object within the spatial range (2304), the virtual tactile device (110) can drive the micro-displacement pulse signal corresponding to the protruding pressure sensation while activating the selection menu or app (2305).

The camera (2005) can recognize the movement of the finger as it moves along the object in the spatial image, tracking the finger's spatial position and movement speed (2306). The virtual tactile device (110) can accordingly drive the micro-displacement pulse signal corresponding to curvature or friction texture (2307). If the finger performs a motion to deselect the object (2308), the process moves to the next step, otherwise, the process continues by recognizing the spatial position and movement speed of the finger as it moves the object.

The action recognized as selecting or moving the object can be set as bending the finger, rotating the finger, or placing another finger on the finger in contact with the object. In another embodiment, when pressure is applied to the micro-displacement element, charge is generated in the piezoelectric element, creating a potential difference, and this sensor signal can be used, or a pressure detection sensor can be added to the wearable device to recognize the selection of the object when another finger touches the wearable device.

The action to deselect the movement of the object can be set as bending the finger twice consecutively, rotating the finger in another direction, or removing the finger that is in contact with the object by another finger, and the present document does not limit this.

Figure 24:
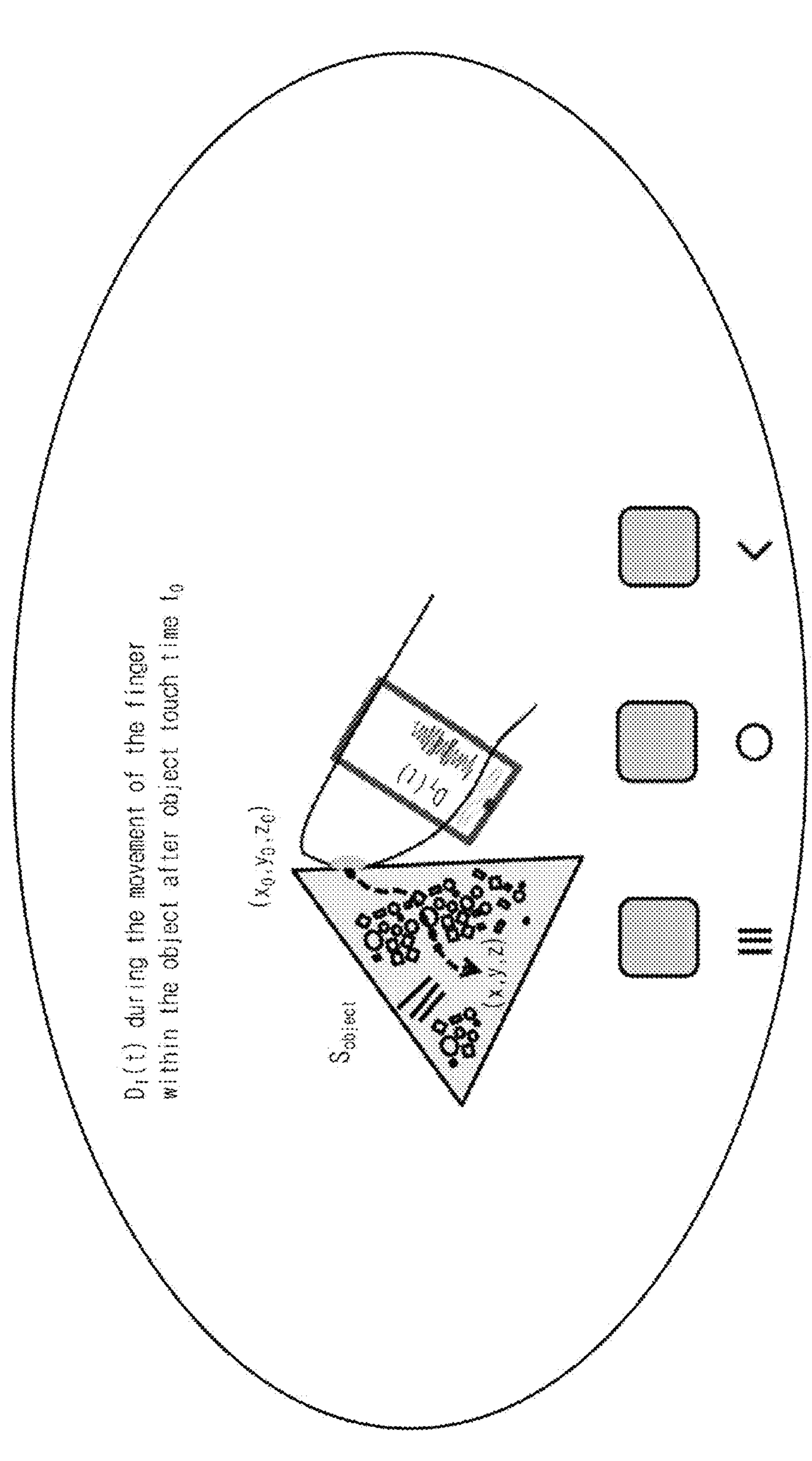
FIG. 24 illustrates a process for providing tactile feedback to a user based on a three-dimensional display terminal, the object displayed on its screen, and the micro-displacement stimulation element of a virtual tactile device, according to another embodiment of the present disclosure.

FIG. 24 illustrates a process for providing tactile feedback to a user based on a three-dimensional display terminal, the object displayed on its screen, and the micro-displacement stimulation element of a virtual tactile device, according to another embodiment of the present disclosure. Specifically, FIG. 24 shows a process in which the spatial position, shape, and physical property information such as the elasticity coefficient of the object displayed in the head-mounted display is linked to the finger's spatial position, recognized by a camera, within the spatial range of the object, and when the finger moves along the surface of the object in the spatial image, the texture ($D_T$) corresponding to the finger's spatial position and movement speed is displayed via neuromorphic micro-displacement pulse stimulation. The objects in the spatial image can be people, animals, plants, educational materials, shopping products, game characters, braille, text, images, and any other objects appearing in the display image, including all protruding and recessed structures or curved shapes of points, lines, and figures.

Figure 25:
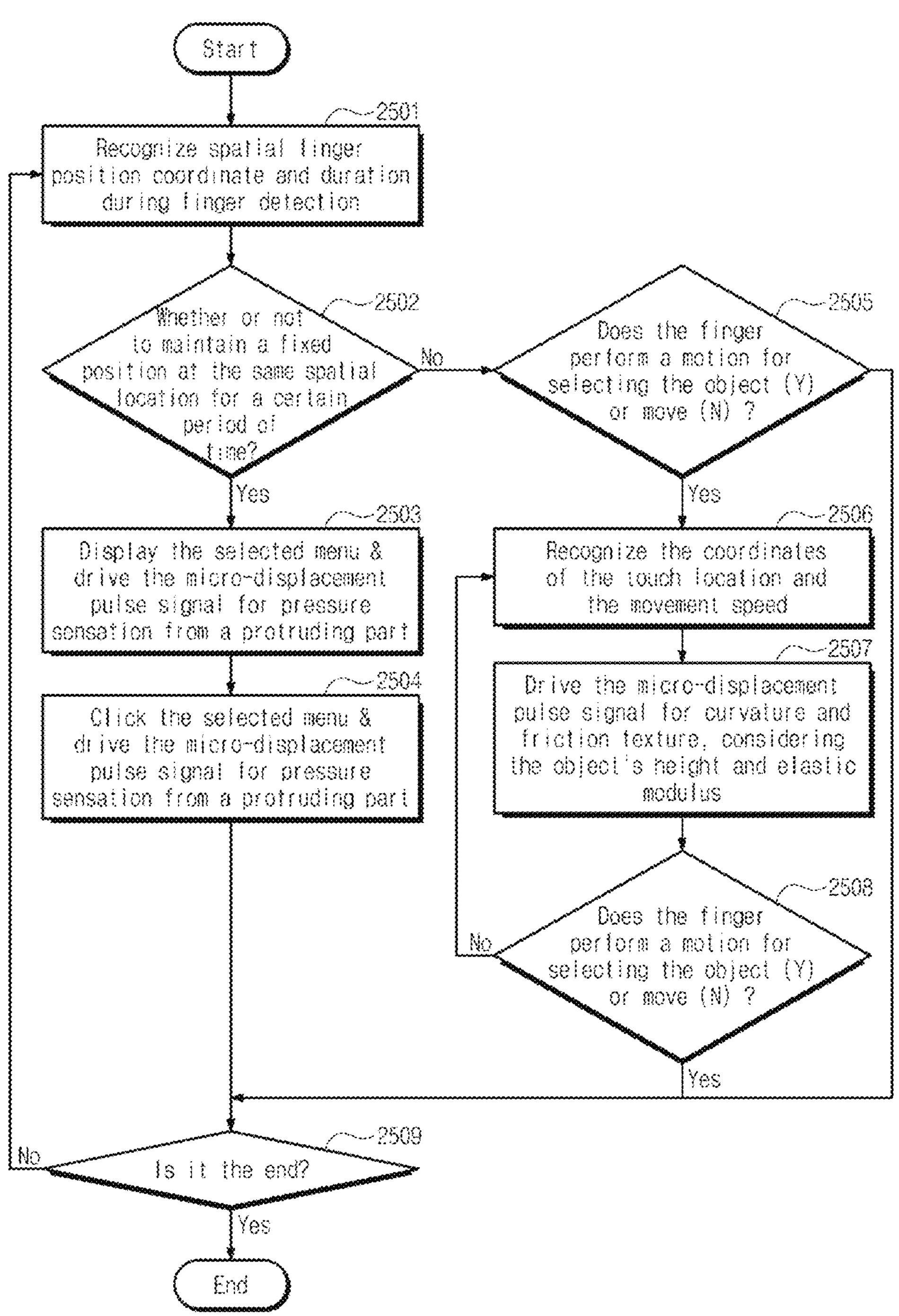
FIG. 25 is a flowchart illustrating a process for providing tactile feedback to a user based on a three-dimensional display terminal and a micro-displacement stimulation element of a virtual tactile device, according to another embodiment of the present disclosure.

FIG. 25 is a flowchart illustrating a process for providing tactile feedback to a user based on a three-dimensional display terminal and a micro-displacement stimulation element of a virtual tactile device, according to another embodiment of the present disclosure. Specifically, FIG. 25 shows a process in which the spatial position, shape, and physical property information such as the elasticity coefficient of the object in the head-mounted display is linked to the finger's spatial position, recognized by a camera, within the spatial range of the object, and when the finger moves along the surface of the object in the spatial image, the texture corresponding to the finger's spatial position and movement speed is displayed via neuromorphic micro-displacement pulse stimulation.

The display terminal (2000) can recognize the spatial position coordinates and the duration when the finger, recognized by the camera (2005), is located within the spatial range of the object (2501). When the finger remains fixed within the spatial range of the object for a certain period (2502), the virtual tactile device (110) can display a selection menu on the spatial screen and simultaneously drive the micro-displacement pulse signal corresponding to the first protrusive pressure sensation (2503). When the selection menu is clicked and activated, the micro-displacement pulse signal corresponding to the second protrusive pressure sensation is driven (2504).

If the finger performs a motion to select and move the object within the spatial range of the object in the spatial image (2505), the display terminal (2000) can recognize the coordinates of the finger's spatial position and its movement speed (2506). The virtual tactile device (110) can drive the micro-displacement pulse signal corresponding to the curvature and frictional texture based on the surface height and elasticity coefficient of the object (2507). If the finger does not perform a motion to deselect the movement (2508), the process of recognizing the spatial position coordinates and the movement speed is repeated (2506). If the finger performs a motion to deselect the movement (2508), the process moves to the next step (2509).

The action recognized as selecting an object or the action recognized as selecting and moving the object can be set as a motion of bending the finger, rotating the finger, or bringing another finger into contact with the finger touching the object. In another embodiment, when pressure is applied to the micro-displacement element, a charge is generated in the piezoelectric element, creating a potential difference. Using this sensor signal, or by additionally incorporating a sensor that detects pressure in the wearable device, it can be recognized as selecting the object when another finger touches the wearable device. The action to deselect the movement of the object can be set as bending the finger twice consecutively, rotating the finger in another direction, or removing the finger touching the object. The present document does not limit these embodiments.

As another embodiment of the virtual tactile device, it can be used as an additional or optional function in wearable devices, such as a ring, thimble, or glove, in conjunction with a smartphone. It can be used to signal different patterns of tactile feedback, such as protruding pressure sensation, vibration, curvature, and texture, when a phone call, message, or alarm is received on the smartphone. Currently, various tactile alarm functions using the virtual tactile device described in this document can be applied to products in the healthcare functions of smart rings.

The above description provides specific embodiments for implementing the present document. The present document also includes embodiments that can be easily modified or designed differently from the described embodiments. Furthermore, the present document will include technologies that can be easily modified or implemented using the described embodiments. Therefore, the scope of the present document should not be limited to the specific embodiments described above, but should be determined by the patent claims that follow and those equivalent to the claims.

According to one embodiment of the present document, by precisely stimulating the tactile receptors in the finger skin to trigger neural action potential spikes, the user can realistically experience various tactile sensations, such as protruding pressure, curvature, and friction, in a virtual environment. This enables the implementation of virtual tactile sensations, linked to the position, shape, and physical property information of an object, based on the position and movement of the finger on two-dimensional and three-dimensional displays such as touchscreen displays and VR/AR/MR.

Furthermore, one embodiment of the present document supports haptic feedback displays and ultra-realistic metaverse technologies through the use of finger-wearable devices, contributing not only to the information and communications and media industries but also to haptic technologies applied in non-invasive surgical tools, such as laparoscopic surgery. This contributes to the advancement of medical device technology, as well as the development of innovative display and interface technologies centered around user experience.

What is claimed is:

1. A virtual tactile system, comprising:

a display terminal; and a wearable device that is capable of being worn on a finger, which receives information on the position, shape, and physical properties of an object displayed on the screen of the display terminal, as well as information regarding the position of the user's finger;

wherein the wearable device includes a micro-displacement stimulation element that is closely attached to the finger skin, wherein when the finger wearing the wearable device contacts the object displayed on the screen of the display terminal or moves on the screen of the display terminal, the micro-displacement stimulation element applies a micro-displacement stimulus to the finger skin, wherein the micro-displacement stimulus is a pulse signal having a waveform of a sine wave, a triangular wave, or a square wave, and wherein the micro-displacement stimulation element varies a pulse width and an amplitude of the micro-displacement stimulus over time to selectively trigger action potentials of multiple tactile receptors in the finger skin, and controls a time interval between pulses of the micro-displacement stimulus to control a time interval at which each of the action potentials is triggered, thereby providing tactile feedback including protruding pressure sensation, curvature, and friction texture in coordination with the screen of the display terminal.

2. The virtual tactile system of claim 1, wherein:
the micro-displacement stimulus is less than 100 micrometers (um) in size; and
the micro-displacement stimulus is applied in sequence by combining signals with a pulse waveform having a duration of less than 100 milliseconds (msec).

3. The virtual tactile system of claim 1, wherein:
the display terminal is a 2-dimensional display terminal selected from one of a smartphone, tablet computer, touchscreen desktop computer, touchscreen laptop computer, touchscreen TV, touchscreen CCTV, touchscreen vehicle display, touchscreen navigation device, touchscreen digital signage, or a remotely controlled drone, robot, or surgical medical device monitor; and
the information regarding the finger position is the position information where the finger contacts the screen of the display terminal.

4. The virtual tactile system of claim 1, wherein:
the display terminal is a 3-dimensional spatial display terminal selected from one of a head-mounted display, glasses-type display, or artificial retina display;
the 3-dimensional spatial display terminal includes a camera; and
the information regarding the finger position is the position information of the finger obtained by the camera recognizing the finger.

5. The virtual tactile system of claim 1, wherein:
the micro-displacement stimulus element is mounted in an array of two or more on the wearable device, applying individual micro-displacement pulse signals to two areas of the finger skin.

6. The virtual tactile system of claim 1, wherein:
the shape of the object includes shape and height information in a 2-dimensional plane, and
the stimulation applied by the micro-displacement stimulus element provides tactile feedback of friction texture corresponding to the shape of the object.

7. The virtual tactile system of claim 1, wherein:
for the object, physical property information including the size of protruding pressure or the elasticity coefficient is assigned based on the position of the display terminal; and
the stimulation applied by the micro-displacement stimulus element provides tactile feedback of protruding pressure, curvature, and friction texture in coordination with the physical property information.

8. The virtual tactile system of claim 1, wherein:
the object comprises a surface structure formed of one or more of a protruding or concave structure, or a figure having an area.

9. The virtual tactile system of claim 1, wherein:
the wearable device is one of a ring, thimble, or glove.

10. The virtual tactile system of claim 1, wherein:
the micro-displacement stimulus element includes a piezoelectric actuator.

11. A virtual tactile device operable in coordination with a display terminal, comprising:
a wearable device that receives information on the position, shape, and physical properties of an object displayed on the screen of the display terminal, as well as information regarding the position of the user's finger, and
a micro-displacement stimulus element attached to the finger skin;
wherein when the finger wearing the wearable device contacts the object displayed on the screen of the display terminal or moves on the screen, the micro-displacement stimulus element applies a micro-displacement stimulus to the finger skin,
wherein the micro-displacement stimulus is a pulse signal having a waveform of a sine wave, a triangular wave, or a square wave, and
wherein the micro-displacement stimulus element varies a pulse width and an amplitude of the micro-displacement stimulus over time to selectively trigger action potentials of multiple tactile receptors in the finger skin, and controls a time interval between pulses of the micro-displacement stimulus to control a time interval at which each of the action potentials is triggered, thereby providing tactile feedback including protruding pressure, curvature, and friction texture in coordination with the screen of the display terminal.

12. The virtual tactile device of claim 11, wherein:
the micro-displacement stimulus is less than 100 micrometers (um) in size, and
the micro-displacement stimulus is applied in sequence by combining signals with a pulse waveform having a duration of less than 100 milliseconds (msec).

13. The virtual tactile device of claim 11, wherein:
the micro-displacement stimulus element is mounted in an array of two or more on the wearable device, applying individual micro-displacement pulse signals to two areas of the finger skin.

14. The virtual tactile device of claim 11, wherein:
the shape of the object includes shape and height information in a 2-dimensional plane, and
the stimulation applied by the micro-displacement stimulus element provides tactile feedback of friction texture corresponding to the shape of the object.

15. The virtual tactile device of claim 11, wherein:
for the object, physical property information including the size of protruding pressure or the elasticity coefficient is assigned based on the position of the display terminal, and
the stimulation applied by the micro-displacement stimulus element provides tactile feedback of protruding pressure, curvature, and friction texture in coordination with the physical property information.

16. The virtual tactile device of claim 11, wherein:
the micro-displacement stimulus element includes a piezoelectric actuator.

* * * * *